(12) United States Patent
Kato et al.

(10) Patent No.: US 7,122,596 B2
(45) Date of Patent: Oct. 17, 2006

(54) ARTIFICIAL LEATHER AND METHOD OF PRODUCING THE SAME

(75) Inventors: Mitsuru Kato, Okayama (JP); Kimio Nakayama, Okayama (JP); Nobuo Takaoka, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 283 days.

(21) Appl. No.: 10/633,571

(22) Filed: Aug. 5, 2003

(65) Prior Publication Data
US 2004/0023013 A1 Feb. 5, 2004

(30) Foreign Application Priority Data

Aug. 5, 2002 (JP) .............................. 2002-226881
Aug. 5, 2002 (JP) .............................. 2002-226882

(51) Int. Cl.
*C08J 3/00* (2006.01)
*C08K 3/20* (2006.01)
*C08L 75/00* (2006.01)
*B32B 5/02* (2006.01)
*B32B 27/00* (2006.01)

(52) U.S. Cl. ................... 524/507; 428/423.1; 428/221; 428/295.1; 428/297.4; 428/319.3; 428/319.7; 442/43; 442/58; 442/95; 442/102; 442/119; 442/154; 442/155; 524/591; 524/839; 524/840; 524/457; 525/63; 525/69; 525/123; 525/127; 525/455

(58) Field of Classification Search ................ 524/507, 524/591, 839, 840, 457; 525/123, 455, 63, 525/69, 127; 428/423.1, 221, 295.1, 297.4, 428/319.3, 319.7; 442/43, 58, 95, 102, 119, 442/154, 155
See application file for complete search history.

(56) References Cited

U.S. PATENT DOCUMENTS

| 5,503,899 A | 4/1996 | Ashida et al. |
| 5,876,466 A | 3/1999 | Nakashima et al. |
| 6,322,851 B1 | 11/2001 | Adachi et al. |
| 6,451,404 B1 | 9/2002 | Nobuto et al. |
| 6,479,153 B1 | 11/2002 | Kato et al. |
| 6,517,938 B1 | 2/2003 | Andoh et al. |
| 6,641,619 B1 | 11/2003 | Nobuto et al. |
| 6,924,336 B1 * | 8/2005 | Faust et al. .................. 524/507 |

FOREIGN PATENT DOCUMENTS

| EP | 1 041 191 A2 | 10/2000 |
| JP | 2000-017034 | * 1/2000 |

* cited by examiner

Primary Examiner—Patrick D. Niland
(74) Attorney, Agent, or Firm—Oblon, Spivak, McClelland, Maier & Neustadt, P.C.

(57) ABSTRACT

Provided are a leather-like sheet fabricated by infiltrating an aqueous resin dispersion (A) into a fibrous substrate, which satisfies a requirement (I) that the aqueous resin dispersion, (A) comprises essentially a main resin (a) stabilized with a surfactant, a polymer (b) having a polyoxyethylene group in its side chains, and a surfactant (c), a requirement (II) that the main resin (a) comprises an urethane resin (a1) and/or an urethane-acrylic composite resin (a2), and the resin skeleton contains from 1 to 10 mmols of a carboxyl group per 100 g of the resin, a requirement (III) that the polymer (b) is obtained through polymerization of a polyoxyethylene group-having ethylenic unsaturated monomer (b1) and any other ethylenic unsaturated monomer (b2) in a ratio by mass (b1)/(b2)=60/40 to 100/0, and a requirement (IV) that the percentage, % by mass ($\alpha$) of the polyoxyethylene group in the polymer (b) and the number of mols ($\beta$) of the amino group per gram of the polymer (b) satisfy $35 \leq \alpha + \beta \times 20000 \leq 60$; and an industrial advantageous method for producing the sheet. The leather-like sheet has a good feel and good physical properties.

25 Claims, No Drawings

ARTIFICIAL LEATHER AND METHOD OF PRODUCING THE SAME

BACKGROUND OF THE INVENTION

1. Field of the Invention

The present invention relates to a leather-like sheet having a good feel and good physical properties, to an aqueous resin dispersion for producing it, and to a method of using the aqueous resin dispersion for producing such a leather-like sheet.

2. Description of the Prior Art

Heretofore known in the art, leather-like sheets are fabricated, for example, by infiltrating a resin component such as urethane resin into a fibrous substrate such as nonwoven fabric followed by raising a fibrous nap on the surface of the thus-processed substrate, or by laminating a resin layer on the surface of such a substrate. For the resin component that is imparted to the nonwoven fabric, for example, known are urethane resin and acrylic resin. Urethane resin is widely used for it in view of the feel and the mechanical properties of the leather-like sheets fabricated with it.

One ordinary method for fabricating such leather-like sheets with a resin component infiltrated into the fibrous substrate thereof comprises infiltrating a resin solution in an organic solvent such as dimethylformamide into a fibrous substrate such as nonwoven fabric, followed by solidifying the resin in the substrate. However, the method that uses an organic solvent is unfavorable from the viewpoint of the environmental protection and the process safety. Taking these into consideration, various methods that are substitutable for the method with an organic solvent have been proposed. They comprise impregnating a fibrous substrate with an aqueous resin dispersion to fabricate leather-like sheets, but most of them are not as yet industrialized. One reason is, when an aqueous resin dispersion is used in fabricating leather-like sheets, the resin may locally move inside the fibrous substrate during the step of drying the aqueous resin dispersion, thereby giving a structural morphology with fibers strongly restrained by the locally-concentrated resin, and, as a result, the sheets fabricated may lose their flexibility and have a stiff feel.

To solve the problem with the process that uses an aqueous resin dispersion, various methods have been proposed for uniformly introducing resin into a fibrous substrate. For example, after an aqueous resin dispersion has been infiltrated into a fibrous substrate, it is heat-sensitive gelled. Concretely, one method proposed for fabricating artificial leather comprises applying an emulsion that has been prepared by dissolving an inorganic salt in a nonionic surfactant-containing aqueous polyurethane emulsion, to a fibrous substrate followed by drying it under heat (JP-A 6-316877, 7-229071). However, the artificial leather fabricated according to the method proposed in these patent references is still unsatisfactory in point of the flexibility, fulfillment, feel and durability thereof. This is because the resin concentration in the emulsion used in the proposed method is at most about 10% and is extremely low and therefore only a small amount of the resin may be infiltrated into the fibrous substrate, and, in addition, when the resin concentration in the emulsion is not larger than 20%, the resin does not almost heat-sensitive gel. On the other hand, if a large amount of an inorganic salt is added to the emulsion and when the resin concentration in the emulsion is high, for example, 30% or more, then the emulsion may thicken or gel by itself and may be unstable with elapsed time.

Another method proposed for fabricating leather-like sheets comprises infiltrating an urethane resin emulsion or an urethane-acrylic composite resin emulsion having a heat sensitive gellability in which the resin has an elastic modulus falling within a specific range, into a fibrous substrate followed by heat-sensitive gelling it and drying it (JP-2000-17582, 2000-303370). The leather like-sheets fabricated therein are surely improved in point of the feel and the physical properties thereof, but the method proposed in these patent references, which comprises applying such a heat-sensitive gellable resin to a fibrous substrate, is still problematic and will be industrially after all impracticable since the emulsion to be used therein may thicken with elapsed time and may gel within a few hours to a few days even at around room temperature. In addition, if a low-molecular surfactant such as that shown in the patent references is used as a heat-sensitive gelling agent, then the feel and the physical properties of the leather-like sheets obtained may lower. This is because, when the sheets are dyed or are processed with hot water for converting the fibers of the fibrous substrate into ultra-fine fibers, then they may be significantly deformed owing to the water absorption by the resin therein.

Still another method proposed for fabricating artificial leather comprises infiltrating an aqueous resin composition that comprises an aqueous urethane resin, an inorganic salt, and a nonionic surfactant having a clouding point, into a fibrous substrate, followed by heat-sensitive gelling it and drying it (JP-A 11-335975). Even in this method, however, it is still difficult to smoothly fabricate leather-like sheets since the emulsion used therein is unstable and, especially in summer, the emulsion may thicken or gel by itself.

On the other hand, a method for producing an emulsion that is stable in a liquid and has a heat-sensitive gellability has been proposed, which comprises adding an organopolysiloxane-type heat-sensitive gelling agent or a nonionic surfactant-type heat-sensitive gelling agent is added to an emulsion of an acrylic resin having a specific functional group (JP-A 6-256617, 6-329867, 7-90154). In the method, however, the structure of the resin to be used is limited to an extremely narrow range, and the resin of the type is unfavorable for fabrication of leather-like sheets. These patent references are silent at all on a method of making urethane resin and urethane-acrylic composite resin that are especially favorable for fabrication of leather like-sheets, heat-sensitive gellable. In these patent references, described are organopolysiloxane and alkylphenol-formaldehyde condensate alkylene oxide adduct that are favorable for the heat-sensitive gelling agent. However, the former is extremely expensive and is therefore industrially disadvantageous since it increases the product costs; and the latter is unfavorable since its raw material, alkylphenol is a type of hormone disrupting chemicals, and formaldehyde causes sick house syndromes. Further proposed is an aqueous resin composition of which the viscosity reversibly increases relative to the ambient temperature (JP-A 9-111133). However, the aqueous resin composition described in this patent reference does not irreversibly gel but its viscosity reversibly increases, and even when the aqueous resin composition of the type is used in fabricating leather-like sheets, it may again liquefy while it is heat-sensitive gelled and dried, and the resin may move in the dried fibrous substrate. If so, the resin having been infiltrated into the substrate may have a structural morphology with fibers strongly restrained by the locally-concentrated resin, and, as a result, the sheets fabricated may lose their flexibility and have a stiff feel. In our further studies, we, the present inventors have found that the viscosity-increasing compounds shown in this patent reference are not so effective for heat-sensitive gelling of surfactant-stabilized urethane resin and urethane-acrylic composite resin that are favorable for fabrication of leather-like sheets, and therefore the compounds are unfavorable for fabrication of leather-like sheets.

SUMMARY OF THE INVENTION

Objects of the invention are to provide a leather-like sheet that is fabricated by infiltrating an aqueous resin dispersion into a fibrous substrate and has a soft and fulfilled feel and good physical properties; to provide an aqueous resin dispersion for fabricating the leather like sheet; and to provide an industrial advantageous method of using the aqueous resin dispersion for fabricating leather-like sheets.

To attain the objects as above, we the present inventors have assiduously studied and, as a result, have found that we may attain the objects when we use an aqueous resin dispersion that contains specific component for the resin to be infiltrated into a fibrous substrate.

Specifically, the invention provides a leather-like sheet fabricated by infiltrating an aqueous resin dispersion (A) into a fibrous substrate, which satisfies the following requirements (I) to (IV):

(I) the aqueous resin dispersion (A) comprises essentially a main resin (a) stabilized with a surfactant, a polymer (b) having a polyoxyethylene group in its side chains, and a surfactant (c);

(II) the main resin (a) comprises an urethane resin (a1) and/or an urethane-acrylic composite resin (a2), and the resin skeleton contains from 1 to 10 mmols of a carboxyl group per 100 g of the resin;, (III) the polymer (b) is obtained through polymerization of a polyoxyethylene group-having ethylenic unsaturated monomer (b1) and any other ethylenic unsaturated monomer (b2) in a ratio by mass (b1)/(2)=60/40 to 100/0;

(IV) the percentage, % by mass ($\alpha$) of the polyoxyethylene group in the polymer (b) and the number of mols ($\beta$) of the amino group per gram of the polymer (b) satisfy the following formula (1):

$$35 \leq \alpha + \beta 20000 \leq 60 \qquad (1).$$

The invention also provides an aqueous resin dispersion (A) to be infiltrated into a fibrous substrate, which satisfies the following requirements (I) to (IV):

(I) the aqueous resin dispersion (A) comprises essentially a main resin (a) stabilized with a surfactant, a polymer (b) having a polyoxyethylene group in its side chains, and a surfactant (c);

(II) the main resin (a) comprises an urethane resin (a1) and/or an urethane-acrylic composite resin (a2), and the resin skeleton contains from 1 to 10 mmols of a carboxyl group per 100 g of the resin;

(III) the polymer (b) is obtained though polymerization of a polyoxyethylene group-having ethylenic unsaturated monomer (b1) and any other ethylenic unsaturated monomer (b2) in a ratio by mass (b1)/(b2)=60/40 to 100/0;

(IV) the percentage, % by mass ($\alpha$) of the polyoxyethylene group in the polymer (b) and the number of mols ($\beta$) of the amino group per gram of the polymer (b) satisfy the following formula (1):

$$35 \leq \alpha + \beta \times 20000 \leq 60 \qquad (1).$$

The invention further provides a method of using the aqueous resin dispersion (A) for fabricating leather-like sheets.

DETAILED DESCRIPTION OF THE PREFERRED EMBODIMENT

The invention is described in detail hereinunder.

The fibrous substrate for use in the invention may be any and every one that is thick in some degree and fulfillment and has a soft feel, for which, for example, usable are various fibrous substrates that have heretofore been used in fabrication of leather-like sheets such as typically nonwoven fabrics, woven fabrics and knitted fabric. Especially preferred are nonwoven fabrics as they readily give natural leather-like feel and physical properties. The fibers that constitute the fibrous substrate may be any ordinary natural fibers, semi-synthetic fibers or synthetic fibers, for which, however, preferred are ultra-fine synthetic fibers or synthetic fibers that may be converted into ultra-fine fibers (they may be referred to as ultra-fine fibers-forming fibers). Especially preferred are multi-component fibers formed of multiple polymer substances, of which the cross section of the fiber has a laminar or sea-islands profile of the multiple polymer substances. The laminar-profiled multi-component fibers may be processed into ultra-fine fibers by peeling the layered structure or by removing one of the layered polymer substance components; and the sea-islands multi-component fibers may be processed into ultra-fine fibers by removing the polymer substance of the sea component. For removing the polymer substance, it is desirable that the polymer substance is a water-soluble substance and the substance is removed by the use of an aqueous remover, since the process does not use an organic solvent that may be harmful to the environment and the safety.

The polymer substance to constitute the fibrous substrate includes, for example, polyamides such as nylon 6, nylon 12, nylon 66, nylon 912 (nylon formed of nonamethylenediamine and/or 2-methyl-1,8-octanediamine, and dodecanoic diacid), nylon 6/12 (copolymer of caprolactam and laurolactam), nylon 6T (nylon composed of hexamethylenediamine and terephthalic acid), nylon 9T (nylon formed of nonamethylenediamine and/or 2-methyl-1,8-octanediamine, and terephthalic acid), polyamide block copolymer (polyamide elastomer); polyesters such as polyalkylene terephthalates, e.g., polyethylene terephthalate, polypropylene terephthalate, polybutylene terephthalate, as well as polyethylene naphthalate, polypropylene naphthalate, polybutylene naphthalate, polyester block copolymer (polyester elastomer); polyolefins such as polyethylene, polypropylene, polymethylpentene, ethylene-$\alpha$-olefin copolymers; polystyrene-based polymers such as typically polystyrene, polystyrene-based block copolymer (polystyrene elastomer); polyvinylidene chloride, polyvinyl acetate, ethylene-vinyl acetate copolymer, polyvinyl alcohol, saponified ethylene-vinyl acetate copolymer, polymethacrylate, polyurethane elastomer. These may be suitably selected depending on the use and the required properties.

Though not specifically defined, the mean single-fiber fineness of the fibers that constitute the fibrous substrate for the leather-like sheets of the invention (when the fibers are synthetic fibers that may be converted into ultra-fine fibers, the fineness is of the ultra-fine fibers converted from them) preferably falls between 0.0001 and 1 dtex, more preferably between 0.001 and 0.5 dtex, even more preferably between 0.01 and 0.4 dtex, from the viewpoint of the feel of the leather-like sheets fabricated and of the colorability thereof when the sheets are colored. The apparent density of the substrate preferably falls between 0.1 and 0.5 g/cm$^3$ or so, and the thickness thereof preferably falls between 0.3 and 5.0 mm or so, in view of the leather-like soft and fulfilled feel and the flexibility of the sheets fabricated.

The aqueous resin dispersion (A) to be infiltrated into the fibrous substrate in the invention comprises essentially a main resin (a) stabilized with a surfactant, a polymer (b) having a polyoxyethylene group in its side chains, and a surfactant (c). The aqueous resin dispersion (A) may contain an inorganic metal salt (d).

In case where the aqueous resin dispersion (A) does not contain a polymer (b) having a polyoxyethylene group in its side chains (b), it does not have a heat-sensitive gelability and the resin may move inside the fibrous substrate while the aqueous resin dispersion (A) is dried therein, thereby giving a structural morphology with fibers strongly restrained by the locally-concentrated resin, and, as a result, the sheets fabricated may lose their flexibility and have a stiff feel to be deteriorated in a physical property. The heat-sensitive gelability as referred to herein means that a liquid loses its fluidity to gel when heated, and it is still kept gelled even when cooled to room temperature.

The polymer (b) must be a polymer that is obtained through polymerization of a polyoxyethylene group-having ethylenic unsaturated monomer (b1) and any other ethylenic unsaturated monomer (b2) in a ratio by mass (b1)/(b2)=60/40 to 100/0. If the ratio by mass, (b1)/(b2) is smaller than 60/40, the aqueous resin dispersion (A) could not well heat-sensitive gel, and the effect of the polymer (b) to prevent the resin from moving in the substrate while dried will be insufficient. If so, therefore, the leather-like sheets fabricated may lose their flexibility and have a stiff feel, and their physical properties will be poor. More preferably, the ratio by mass (b1)/(b2) falls between 65/35 and 100/0, even more preferably between 70/30 and 100/0.

In addition, the percentage, % by mass ($\alpha$) of the polyoxyethylene group in the polymer (b) and the number of mols ($\beta$) of the amino group per gram of the polymer (b) must satisfy the following formula (1):

$$35 \leq \alpha + \beta \times 20000 \leq 60 \qquad (1).$$

The amino group includes all of the primary amino group, the secondary amino group, the tertiary amino group and their salts in the polymer (b). In case where the percentage, % by mass ($\alpha$) of the polyoxyethylene group in the polymer (b) and the number of mols ($\beta$) of the amino group per gram of the polymer (b) are lower than the range defined by formula (1), the solubility of the polymer (b) in water will be insufficient and the polymer (b) could not therefore mix in the aqueous resin dispersion (A), or even though it could mix therein, the liquid stability of the aqueous resin dispersion (A) will be poor. The liquid stability as referred to herein means that the viscosity of the liquid does not change. On the other hand, if the percentage, % by mass ($\alpha$) of the polyoxyethylene group in the polymer (b) and the number of mols ($\beta$) of the amino group per gram of the polymer (b) are higher than the range defined by formula (1), the aqueous resin dispersion (A) could not well in the heat-sensitive gellability and the effect of the polymer (b) to prevent the resin from moving in the substrate while dried will be insufficient. If so, therefore, the leather-like sheets fabricated may lose their flexibility and have a stiff feel, and their physical properties will be poor.

Preferably, the percentage, % by mass ($\alpha$) of the polyoxyethylene group in the polymer (b) and the number of mols ($\beta$) of the amino group per gram of the polymer (b) satisfy the following formula (3):

$$36 \leq \alpha + \beta \times 20000 \leq 59 \qquad (3),$$

more preferably, the following formula (4):

$$37 \leq \alpha + \beta \times 20000 \leq 58 \qquad (4).$$

Further preferably, the percentage, % by mass ($\alpha$) of the polyoxyethylene group in the polymer (b) satisfies the following formula (5):

$$38 \leq \alpha \leq 56 \qquad (5),$$

and the number of mols ($\beta$) of the amino group per gram of the polymer (b) satisfies the following formula (6):

$$0 \leq \beta \times 20000 \leq 2 \qquad (6).$$

Also preferably, the polyoxyethylene group-having ethylenic unsaturated monomer (b1) that constitutes the polymer (b) is a compound having a structure of the following general formula (I), as it more readily satisfies the heat-sensitive gellabiity and the liquid stability of the aqueous resin dispersion (A):

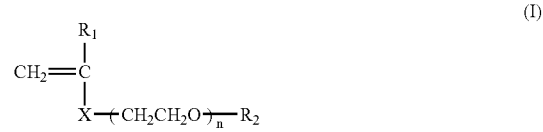

wherein $R_1$ represents a hydrogen atom or a methyl group; $R_2$ is a group selected from an alkyl group, an aryl group or an alkylaryl group having from 1 to 18 carbon atoms; X represents a group selected from —C(=O)O—, —OC(=O)—, —O—, —NHC(=O)—, —C(=O)NH—; and n indicates an integer of 2 or more.

Especially preferably, $R_2$ is an alkyl group having from 1 to 4 carbon atoms, as the compound of the type betters the liquid stability of the aqueous resin dispersion (A). Also preferably, X is —C(=O)O—, as the monomer for the compound is readily available and the monomer polymerization to give the compound is easy.

Also preferably, the number of the repetitions n of the oxyethylene unit in the polyoxyethylene group-having ethylenic unsaturated monomer (b1) is from 2 to 10, since the compound of the type betters the heat-sensitive gellability of the aqueous resin dispersion (A).

Examples of the monomer of the type are methoxydiethylene glycol monomethacrylate (in which the number of the repetitions of the oxyethylene unit is 2, such as [NK Ester M-20G] produced by Shin-Nakamura Chemical co., ltd), methoxytetraethylene glycol monomethacrylate (in which the number of the repetitions of the oxyethylene unit is 4, such as [NK Ester M-40G] produced by Shin-Nakamura Chemical co., ltd), ethoxydiethylene glycol monoacrylate (in which the number of the repetitions of the oxyethylene unit is 2, such as [Light Acrylate EC-A] produced by Kyoeisha Chemical co., ltd), methoxytriethylene glycol monoacrylate (in which the number of the repetitions of the oxyethylene unit is 3, such as [Light Acrylate MTG-A] produced by Kyoeisha Chemical co., ltd). One or more of these may be used herein.

The other ethylenic unsaturated monomer (b2) that is copolymerizable with the polyoxyethylene unit having ethylenic unsaturated monomer (b1) may be any known conventional, ethylenic unsaturated monomer not having a polyoxyethylene unit. For example, it includes (meth)acrylic acid and its derivatives such as methyl(meth)acrylate, ethyl (meth)acrylate, butyl(meth)acrylate, 2-ethylhexyl(meth) acrylate, lauryl(meth)acrylate, cyclohexyl(meth)acrylate, dimethylaminoethyl(meth)acrylate, diethylaminoethyl (meth)acrylate, 2-hydroxyethyl(meth)acrylate; styrene and its styrene derivatives such as α-methylstyrene, p-methylstyrene; acrylamides such as (meth)acrylamide, diacetone (meth)acrylamide, N-isopropyl(meth)acrylamide; maleic acid, fumaric acid, itaconic acid and their derivatives; heterocyclic vinyl compounds such as vinylpyrrolidone; vinyl compounds such as vinyl chloride, acrylonitrile, methyl vinyl ether, ethyl vinyl ether, vinyl ketone, vinyl acetate; and α-olefins such as ethylene, propylene. One or more of these may be used herein. Of those, preferred are alkyl(meth) acrylates such as methyl(meth)acrylate, ethyl(meth)acrylate, butyl(meth)acrylate and 2-ethylhexyl(meth)acrylate, as the polymer (b) copolymerized with any of them more readily keeps the liquid stability and the heat-sensitive gellability of the aqueous resin dispersion. If desired, the above-mentioned, monofunctional ethylenic unsaturated monomer may be combined with a small amount of a difunctional or more polyfunctional ethylenic unsaturated monomer to give the polymer (b) so far as the thus-copolymerized polymer (b) is soluble in water at a temperature not higher than its clouding point.

For controlling the molecular weight of the polymer (b), usable is a chain transfer agent such as octanethiol, thioglycerol, 2-mercaptoethanol, 2-ethylhexyl thioglycolate, α-methylstyrene dimer. Preferably, the polymer (b) has a number-average molecular weight of from 5,000 to 100,000, since its ability to improve the heat-sensitive gellability of the aqueous resin dispersion is good and since its influence on the liquid viscosity of the aqueous resin dispersion is not great.

The polymer (b) may be produced in a known method. For example, it may be produced through emulsion polymerization or suspension polymerization by a radical polymerization initiator at a temperature not lower than the clouding point of the polymer (b); or through solution polymerization by a radical polymerization initiator in an organic solvent or in an aqueous solution at a temperature not higher than the clouding point of the polymer (b); or through bulk polymerization by a radical polymerization initiator; or through cationic or anionic polymerization by an ionic polymerization initiator. Of those, the method by a radical polymerization initiator is especially preferred as the polymerization according to the method is easy.

Any known radical polymerization initiator may be used herein, including, for example, oil-soluble peroxides such as benzoyl peroxide, dicumyl peroxide, cumene hydroperoxide, t-butyl hydroperoxide; oil-soluble azo compounds such as 2,2'-azobisisobutyronitrile, 2,2'-azobis(2,4-dimethylvaleronitrile), dimethyl 2,2'-azobisisobutyrate; water-soluble peroxides such as hydrogen peroxide, potassium persulfate, sodium persulfate, ammonium persulfate; and water-soluble azo compounds such as azobiscyanovaleric, acid, 2,2'-azobis(2-amidinopropane) dihydrochloride. One or more of these may be used herein. If desired, the polymerization initiator may be combined with a redox initiator system that comprises a reducing agent and optionally a chelating agent.

Preferably, the number-average of number the repetitions of the oxyethylene unit of the polyoxyethylene group in the polymer (b) is from 2to 5, as the heat-sensitive gellability and the liquid stability of the aqueous resin dispersion (A) can be more readily bettered. More preferably, the number is from 2.1 to 4.8, even more preferably from 2.2 to 4.6.

Also preferably, the clouding point of an aqueous 10% solution of the polymer (b) falls between 10 and 60° C. since the polymer (b) of the type more readily betters the heat-sensitive gellability and the liquid stability of the aqueous resin dispersion (A). More preferably, it falls between 15 and 55° C., even more preferably between 20 and 50° C.

The aqueous resin dispersion (A) of the invention must indispensably contain a surfactant (c). If the aqueous resin dispersion (A) does not contain a surfactant, its heat-sensitive gellability and liquid stability will be poor and the feel and the physical properties of the leather-like sheets fabricated will be not good.

Preferably, the surfactant (c) is composed of from 30 to 100% by mass of a nonionic surfactant (c1) having an HLB value of from 12 to 18 and from 0 to 70% by mass of any other surfactant (c2), since the surfactant (c) of the type more readily betters the liquid stability and the heat-sensitive gellability of the aqueous resin dispersion (A). More preferably, it is composed of from 50 to 90% by mass of (c1) and from 10 to 50% by mass of (c2).

If the HLB value of the nonionic surfactant (c1) is lower than 12, the liquid stability of the heat-sensitive gellable emulsion will be poor; but if higher than 18, the heat-sensitive gellability of the emulsion will lower.

The surfactant for use herein may be any known one, including, for example, nonionic surfactants such as polyoxyethylene lauryl ether, polyoxyethylene stearyl ether, polyoxyethylene nonyl phenyl ether, polyoxyethylene octyl phenyl ether, polyethylene glycol monolaurate, polyethylene glycol monostearate, polyoxyethylene sorbitan monolaurate, polyoxyethylene sorbitan monostearate, polyoxyethylene-polyoxypropylene block copolymer, polyoxyethylene-polysiloxane block copolymer; anionic surfactants such as sodium laurylsulfate, ammonium laurylsulfate, sodium polyoxyethylene tridecyl ether acetate (e.g., [ECT-3NEX]produced by Nikko Chemicals co., ltd), sodium polyoxyethylene lauryl ether sulfate, sodium dodecylbenzenesulfonate, sodium alkyldiphenyl ether sulfonate, sodium di(2-ethylhexyl)sulfosuccinate; and known penetrants and defoaming agents. One or more of these may be used herein. The HLB value of the nonionic surfactant may be measured according to the description in Takehiko Fujimoto, *Introduction to Surfactants*, completely revised edition (published by Sanyo Chemical Industries, ltd), pp. 128–131. In addition, it is described in catalogues of surfactants' manufacturers.

Examples of nonionic surfactants having an HLB value of from 12 to 18 are Emulgen 108 (HLB=12.1), Emulgen 109P (HLB=13.6), Emulgen 120 (HLB=15.3), Emulgen 147 (HLB=16.3), Emulsion 320P (HLB=13.9), Rheodol TW-L120 (HLB=16.7), Rheodol TW-S120 (HLB=14.9), Emanon 1112 (HLB=13.7), Emanon 3115 (HLB=13.4) produced by Kao corporation; Naroacty N-85 (HLB=12.6), Naroacty N-100(HLB=13.3), Naroacty N-140 (HLB=14.7), Naroacty N-200 (HLB=16.0), Naroacty N-400 (HLB=17.8) produced by Sanyo Chemical Industries, ltd. (The HLB values of these commercial products are all those described in the manufacturers' catalogues.)

The main resin (a) that constitutes the aqueous resin dispersion (A) of the invention must be stabilized with a surfactant, comprising an urethane resin (a1) and/or an urethane-acrylic composite resin (a2), and the resin skeleton contains from 1 to 10 mmols of a carboxyl group per 100 g of the resin.

If the main resin (a) is a self-emulsifying resin not stabilized with a surfactant, the aqueous resin dispersion (A) containing it is not almost heat-sensitive gellable, and while dried, the resin is not almost prevented from moving, and, as a result, the sheets fabricated may lose their flexibility and have a stiff feel, and their physical properties will be not good.

If the carboxyl group content of the main resin skeleton is smaller than 1 mmol per 100 g of the resin, the liquid stability of the aqueous resin dispersion (A) will be poor. On the other hand, if the carboxyl group content thereof is over 10 mmols per 100 g of the resin, the heat-sensitive gellability of the aqueous resin dispersion (A) is poor and, while dried, the resin is not almost prevented from moving. If so, the leather-like sheets fabricated may lose their flexibility and have a stiff feel, and their physical properties will be not good. In addition, owing to the polarity of the carboxyl group therein, the resin will firmly adhere to fibers and the physical properties of the leather-like sheets fabricated may be thereby further lowered. Preferably, the carboxyl group content of the resin skeleton is from 1.5 to 9 mmols per 100 g of the resin, more preferably from 2 to 8 mmols per 100 g of the resin. The carboxyl group in the resin may be neutralized to form a salt. Falling within the range defined as above, the carboxyl group, even though neutralized, does not make the main resin (a) self-emulsifiable.

Preferably, the main resin (a) is the urethane-acrylic composite resin (a2) since the feel and the physical properties of the leather-like sheets fabricated are especially good.

The urethane resin (a1) for the main resin (a) may be any known urethane resin, for example, prepared from essential raw materials of a polymeric polyol, an organic polyisocyanate and a chain extender.

The polyol may be any known one, including, for example, polyether polyols such as polyethylene glycol, polypropylene glycol, polytetramethylene glycol, poly(methyltetramethylene glycol); polyester polyols such as polybutylene adipate diol, polybutylene sebacate diol, polyhexamethylene adipate diol, poly(3-methyl-1,5-pentylene adipate)diol, poly(3-methyl-1,5 -pentylene sebacate)diol, polycaprolactone diol; polycarbonate polyols such as poly(hexamethylene carbonate)diol, poly(3-methyl-1,5-pentylene carbonate)diol; and polyester carbonate polyols. One or more of these may be used herein.

The organic polyisocyanate for use in the invention may be any ordinary organic polyisocyanate that has heretofore been used in producing ordinary urethane resins, including, for example, hexamethylene diisocyanate, isophorone diisocyanate, 4,4'-dicyclohexylmethane diisocyanate, 2,4-tolylene diisocyanate, 2,6-tolylene diisocyanate, 4,4'-diphenylmethane diisocyanate, xylylene diisocyanate. One or more of these may be used herein.

The chain extender for use in the invention may be any ordinary one that has heretofore been used in producing ordinary urethane resins, but is preferably a low-molecular compound having at least two active hydrogen atoms in the molecule capable of reacting with an isocyanate group and having a molecular weight of at most 300. For example, it includes hydrazine, ethylenediamine, propylenediamine, hexamethylenediamine, nonamethylenediamine, xylylenediamine, isophoronediamine, piperazine and their derivatives; diamines such as adipic acid dihydrazide, isophthalic acid dihydrazide; triamines such as diethylenetriamine; tetramines such as triethylenetetramine; diols such as ethylene glycol, propylene glycol, 1,4-butanediol, 1,6-hexanediol, 1,4-bis(β-hydroxyethoxy)benzene, 1,4-cyclohexanediol, triols such as trimethylolpropane; pentaol such as pentaerythritol; aminoalcohols such as aminoethyl alcohol, aminopropyl alcohol. One or more of these may be used herein. For the chain extending reaction to give the urethane resin, the chain extender may be optionally combined with any of monoamines such as ethylamine, propylamine, butylamine; carboxy group having monoamine compounds such as 4-aminobutanoic acid, 6-aminohexanoic acid; and mono-ols such as methanol, ethanol, propanol, butanol.

Introduction of a carboxyl group into the resin skeleton of the urethane resin (a1) is not specifically defined, for which, for example, used is a carboxyl group-having diol, such as 2,2-bis(hydroxymethyl)propionic acid, 2,2-bis(hydroxymethyl)butanoic acid or 2,2-bis(hydroxymethyl)valeric acid, for the raw material for the urethane resin.

For producing an aqueous dispersion of the urethane resin (a1), employable with no specific limitation thereon is any known method of emulsification and dispersion of the urethane resin in water. For example, one method for producing it comprises emulsifying and dispersing a carboxyl group-having, isocyanate-terminated prepolymer that is obtained from a polymeric polyol, a carboxyl group-having diol and an organic polyisocyanate, in water in the presence of an emulsifier at high mechanical shear force, and, at the same time or after the emulsification and dispersion thereof, the molecular weight of the prepolymer is increased through reaction with a chain extender such as polyamine.

The emulsifier to be used in the method may be any one described hereinabove for the surfactant (c) that may be in the aqueous resin dispersion (A).

To facilitate the emulsification and dispersion thereof, the isocyanate-terminated prepolymer may be diluted with an organic solvent such as acetone, 2-butanone, toluene, ethyl acetate, tetrahydrofuran, dimethylformamide. Further, a part or all of the chain extender may be reacted with the prepolymer before emulsification of the urethane resin.

The urethane-acrylic composite resin (a2) for the main resin (a) is prepared, for example, through emulsion polymerization of an ethylenic unsaturated monomer that comprises, as the essential component, a (meth)acrylic acid derivative, in the presence of an aqueous urethane resin dispersion. The polymerization condition for it is not specifically defined and may be the same as that for conventional emulsion polymerization of ordinary ethylenic unsaturated monomers. In general however, the emulsion polymerization is preferably effected at a temperature falling between 0 and 90° C. in an inert gas atmosphere for polymerization stability. The aqueous urethane resin dispersion to be used in the method may be the same as the aqueous dispersion of urethane resin (a1) mentioned hereinabove. For it, the polyurethane prepolymer may be diluted with an ethylenic unsaturated monomer such as typically a (meth)acrylic acid derivative as the main component in place of an organic solvent such as 2-butanone to prepare the aqueous urethane resin dispersion. For the composite resin, preferred is an ethylenic unsaturated group-having urethane resin, since coarse phase separation between the urethane resin and the acrylic resin hardly occurs in the composite resin and since the physical properties of the leather-like sheets fabricated may be much bettered. For introducing an ethylenic unsaturated group into urethane resin, for example, a hydroxyl group-having ethylenic unsaturated monomer, such as 2-hydroxyethyl(meth)acrylate, 2-hydroxypropyl (meth)acrylate, allyl alcohol, 1:2 adduct of ethylene glycol diglycidyl ether and (meth)acrylic acid, or 1:2 adduct of 1,6-hexanediol diglycidyl ether and (meth)acrylic acid, may be used for the raw material for urethane resin.

The ethylenic unsaturated monomer which comprises, as the main component, a (meth)acrylic acid derivative and which is subjected to emulsion polymerization in the presence of the aqueous urethane resin dispersion may be selected from those mentioned hereinabove for the ethylenic unsaturated monomer (b2) for producing the polymer (b). For it, especially preferred are those comprising, as the essential component, an alkyl(meth)acrylate such as methyl (meth)acrylate, ethyl(meth)acrylate, butyl(meth)acrylate, 2-ethylhexyl(meth)acrylate. Also preferably, the resin is copolymerized with a small amount of a polyfunctional ethylenic unsaturated monomer, such as 1,6-hexanediol di(meth)acrylate, 1,9-nonanediol di(meth)acrylate, neopentyl glycol di(meth)acrylate, divinylbenzene or allyl(meth)acrylate, for making the resin have a crosslinked structure.

The polymerization initiator employable in the process may be selected from those mentioned hereinabove for the radical polymerization initiator to be used in producing the polymer (b).

In the urethane-acrylic composite resin (a2), the ratio by mass of the urethane resin component to the acrylic polymer component, preferably falls between 10/90 and 70/30 for fabricating leather-like sheets having a good feel and good physical properties, more preferably between 15/85 and 60/40, even more preferably between 20/80 and 50/50.

The method for introducing a carboxyl group into the resin skeleton of the urethane-acrylic composite resin (a2) is not specifically defined. For it, for example, a carboxyl group is preferably introduced into the skeleton of urethane resin that is a raw material for the urethane-acrylic composite resin (a2), since this facilitates the production of the intended urethane-acrylic composite resin (a2).

The aqueous resin dispersion (A) may contain a crosslinking agent for the main resin (a). The crosslinking agent that may be in the resin dispersion is a water-soluble or water-dispersible compound having, in the molecule, at least two functional groups capable of reacting with the functional group in the main resin (a). Examples of the combination of the functional group in the main resin with the functional group in the crosslinking agent are a carboxyl group and an oxazoline group; a carboxyl group and a carbodiimido group; a carboxyl group and an epoxy group; a carboxyl group and a cyclocarbonate group; a carboxyl group and an aziridine group; a carbonyl group and a hydrazido group. Of those, preferred is a combination of a main resin having a carboxyl group and a crosslinking agent having an oxazoline group or a carbodiimido group, since the liquid stability of the aqueous resin dispersion (A) that comprises the combination is good and since the production of the combination is easy. The crosslinking agent having an oxazoline group includes, for example, Epocros K-2010E, Epocros K-2020E, and Epocros WS-500 produced by Nippon Shokubai co., ltd. The crosslinking agent having a carbodiimido group includes, for example, Carbodilite E-01, Carbodilite E-02, and Carbodilite V-02 produced by Nisshinbo Industries, Inc. The amount of the crosslinking agent that may be in the resin dispersion is preferably at most 20% by mass in terms of the active ingredient of the crosslinking agent and relative to the main resin in the resin dispersion, more preferably at most 15% by mass, even more preferably at most 10% by mass.

In addition, the aqueous resin dispersion (A) may contain an inorganic metal salt (d). The inorganic metal salt that may be in the resin dispersion includes, for example, alkali metal salts such as sodium chloride, sodium sulfate, sodium carbonate, sodium nitrate, potassium chloride; and alkaline earth metal salts such as calcium chloride, calcium sulfate, magnesium chloride. One or more of these may be used herein.

Preferably, the aqueous resin dispersion (A) of the invention contains from 25 to 60% by mass of the main resin (a) as it gives a sufficient amount of resin to a fibrous substrate to fabricate a leather-like sheet having a good fulfillment even when the substrate is dipped only once in the resin dispersion. If the main resin concentration in the aqueous resin dispersion is lower than 25% by mass, the substrate could not have a sufficient amount of resin since the infiltration of the aqueous resin dispersion into the fibrous substrate is limited.

If the operation of dipping in resin, heat-sensitive gellation and drying of the substrate is repeated many times for increasing the amount of resin to be infiltrated into the substrate, it is unfavorable since it increases the production costs. On the other hand, an aqueous resin dispersion in which the main resin concentration is over 60% by mass is difficult to produce. More preferably, the main resin concentration falls between 30 and 55% by mass; even more preferably between 35 and 50% by mass.

Also preferably, the aqueous resin dispersion (A) contains from 0.5 to 10% by mass of the polymer (b) to satisfy both good heat-sensitive gellability and good liquid stability thereof. More preferably, it contains from 0.6 to 8% by mass, even more preferably from 0.7 to 6% by mass of the polymer (b).

Also preferably, the aqueous resin dispersion (A) contains from 0.5 to 5% by mass of the surfactant (c) as its liquid stability and heat-sensitive gellability are both extremely good. More preferably, the surfactant content falls between 0.6 and 4% by mass, even more preferably between 0.7 and 3% by mass.

Also preferably, the content of the inorganic metal salt (d) in the aqueous resin dispersion (A) is at most 2% by mass in view of the liquid stability of the dispersion, more preferably at most 1% by mass, even more preferably at most 0.5% by mass.

Not interfering with the characteristics of the invention, the aqueous resin dispersion (A) of the invention may contain any of thickener, antioxidant, UV absorbent, fluorescent agent, antiseptic, water-soluble polymer compound such as polyvinyl alcohol or carboxymethyl cellulose, dye, pigment and others.

Preferably, the gelling time of the aqueous resin dispersion (A) of the invention is within 10 minutes when it is left in a closed condition at 70° C., and the viscosity increase in the resin dispersion is at most 50% when left in a closed condition at 40° C. for 2 weeks, since the resin dispersion of the type has good heat-sensitive gellability and good liquid stability. The gelling time when left in a closed condition at 70° C. is determined as follows: 30 g of a sample of the aqueous resin dispersion is put into a glass tube (cylindrical tube having an inner diameter of 3 cm and a height of 6 cm) and closed up, and this is dipped in a hot water bath at 70° C. and then allowed to stand. The time which the sample thus dipped in hot water has taken before it completely gels to lose its fluidity is read, and this is the gelling time of the resin dispersion. If the gelling time of the resin dispersion kept in a closed condition at 70° C. is over 10 minutes, then it means that the heat-sensitive gellability of the resin dispersion is not good. If so, the resin moves inside the fibrous substrate during the step of drying the aqueous resin dispersion, thereby giving a structural morphology of strongly restrained fibers, and, as a result, the sheets fabricated may lose their flexibility and have a stiff feel. Even if the resin having infiltrated into the fibrous substrate is heat-sensitive gelled at a temperature much higher than 70° C. to fabricate leather-like sheets, a long time is taken before the substrate reaches a predetermined temperature since the heat-sensitive gellation and the water evaporation proceed simultaneously while the substrate is heated. Therefore, when the heat-sensitive gellability of the resin in the substrate is poor at 70° C., then the feel and the physical properties of the leather-like sheets fabricated are not good. Further, when the heat-sensitive gellation is effected in a hot water bath, there may occur another problem in that the aqueous resin dispersion flows out into the hot water bath to contaminate it. More preferably, the gelling time of the resin dispersion kept in a closed condition at 70° C. is within 9 minutes, even more preferably within 8 minutes. The gellation due to heat of the resin dispersion must be irreversible. This means that the resin dispersion for use in the invention must not be a reversible thickening type resin dispersion that may be again fluid when cooled. If such a reversible thickening type resin dispersion is dried after heat-sensitive gelled, the aqueous resin dispersion will be again liquefied while heated for drying, and, as a result, the thus-liquefied resin may move inside the fibrous substrate to give a structural morphology of strongly restrained fibers and the sheets fabricated may lose their flexibility and have a stiff feel.

The stability of the aqueous resin dispersion of the invention may be evaluated, for example, by the viscosity increase thereof left for a while. Concretely, the viscosity increase in the resin dispersion left in a closed condition at 40° C. for 2 weeks is determined as follows: A sample of the aqueous resin dispersion is put into a closed container, then kept in a thermostat at 40° C. for 2 weeks, and cooled to room temperature (25° C.), and the viscosity increase in the thus-stored sample is obtained according to the following formula:

Viscosity Increase (%)=(viscosity after stored−viscosity before stored)/(viscosity before stored)×100.

If the viscosity increase after left in such a closed condition at 40° C. for 2 weeks is over 50%, then the aqueous resin dispersion will thicken at an elevated temperature in summer or the like and its amount to be infiltrated into a fibrous substrate will therefore fluctuate or aggregated masses may form in the aqueous resin dispersion, and in a serious case, the liquid will wholly gel. Owing to these problems, therefore, it will be difficult to stably produce leather-like sheets by the use of the aqueous resin dispersion. Preferably, the viscosity increase after left in a closed condition at 40° C. for 2 weeks is at most 50%, more preferably at most 40%, even more preferably at most 30%.

The leather-like sheet of the invention may be fabricated by infiltrating the aqueous resin dispersion (A) into a fibrous substrate such as that mentioned hereinabove.

For infiltrating the aqueous resin dispersion into such a fibrous substrate, employable is any method of uniformly infiltrating an aqueous resin dispersion into a fibrous substrate.

For it, in general, preferred is a method of dipping a fibrous substrate in an aqueous resin dispersion. Also employable is a method that comprises infiltrating an aqueous resin dispersion into a fibrous substrate followed by controlling the amount of the resin dispersion having been infiltrated into the substrate by the use of a press roll or a doctor knife.

Next, the aqueous resin dispersion infiltrated into the substrate is heat-sensitive gelled and dried. For gelling it, for example, employable is (1) a method of dipping the fibrous substrate with the aqueous resin dispersion infiltrated therein, in a hot water bath at 60 to 100° C.; (2) a method of exposing the fibrous substrate with the aqueous resin dispersion infiltrated therein, to a hot steam atmosphere at 60 to 180° C.; or (3) a method of directly introducing the fibrous substrate with the aqueous resin dispersion infiltrated therein, into a drier at 60 to 180° C. Of those, preferred are the methods (1) and (2) since they enable the aqueous resin dispersion to gel with no substantial water vaporization and give leather-like sheets having a more flexible feel. In the gelling method (1) or (2), the leather-like sheets fabricated are dried under heat or dried in air to remove the moisture from them.

In case where the fibers that constitute the fibrous substrate is ultrafine fibers-forming fibers, they may be converted into ultrafine fibers according to the method mentioned above before or after the aqueous resin dispersion. (A) has been applied thereto.

If desired, the leather-like sheets of the invention may be processed in any known manner of coloring or napping them on the surface or coating them with a resin layer to give suede-type artificial leather or grain-type artificial leather.

The amount of the aqueous resin dispersion (A) to be infiltrated into the fibrous substrate is preferably from 10 to 200 parts by mass in terms of the solid resin content thereof, relative to 100 parts by mass of the fibrous substrate, more preferably from 20 to 150 parts by mass, even more preferably from 30 to 120 parts by mass. If the amount of the resin infiltrated into the substrate is smaller than 10 parts by mass, the leather-like sheets fabricated could not have a good fulfilled feel; but if larger than 200 parts by mass, the leather-like sheets fabricated could not be flexible.

The leather-like-sheets obtained according to the invention have a soft and fulfilled feel that is similar to the feel of natural leather, and they are favorable not only for clothing but also for accessories, interior goods, shoes, car sheets, bags, porches, various gloves, and sporting goods such as gloves.

EXAMPLES

The invention is described more concretely with reference to the following Examples, which, however, are not intended to restrict the scope of the invention. In the following Examples, the gelling time of the sample left in a closed condition at 70° C.; the viscosity increase in the sample left in a closed condition at 40° C. for 2 weeks; the clouding point of the aqueous solution of polymer; the feel and the tear strength of the leather-like sheet were determined and evaluated according to the methods mentioned below.

Gelling Time of Sample Left in Closed Condition at 70° C.:

30 g of a sample of an aqueous resin dispersion is put into a glass tube (cylindrical tube having an inner diameter of 3 cm and a height of 6 cm) and closed up, and this is dipped in a hot water bath at 70° C. and then allowed to stand. The time which the sample thus dipped in hot water has taken before it completely gels to lose its fluidity is read in a unit of minute.

Viscosity Increase (%) in Resin Dispersion Left in Closed Condition at 40° C. for 2 Weeks:

A sample of an aqueous resin dispersion is put into a closed container, and then kept in a thermostat at 40° C. for 2 weeks. The viscosity of the sample before and after kept at 40° C. is measured according to JIS-K6828, and the viscosity increase in the thus-stored sample is obtained according to the following formula:

Viscosity Increase (%)=(viscosity after stored−viscosity before stored)/(viscosity before stored)×100.

Clouding Point of Aqueous Solution of Polymer:

30 g of an aqueous solution of 10% polymer is put into a glass tube (cylindrical tube having an inner diameter of 3 cm and a height of 6 cm) and closed up, and this is heated from 10° C. at a heating rate of 1° C./min. The point at which the solution has become completely cloudy is the clouding point of the aqueous solution.

Feel of Leather-like Sheet:

A leather-like sheet to be evaluated is felt with fingers and evaluated as follows: Samples having an extremely good feel like natural leather are "A", those having a good feel similar to that of natural leather, though their soft and/or fulfilled feel is not so good, are "B"; and those that are tougher and less flexible than natural leather and/or those not having a fulfilled feel and not having a natural leather-like feel are "C".

Tear Strength of Leather-like Sheet:

A test piece having a width of 4 cm is cut to have a 5-cm slit in the center thereof, and this is stretched and torn at a pulling rate of 10 cm/min by the use of a tensile tester. The maximum load under which the sample has been torn is measured, and the data in the machine direction and the cross direction are averaged to determine the tear strength (N) of the sample.

The abbreviations of the compounds used in the following Reference Examples, Examples and Comparative Examples are shown in Table 1.

Production of Fibrous Substrate:

Reference Example 1

PET and nylon 6 were melt extruded through different extruders and separately metered each via a gear pump to be in a ratio by mass, PET/nylon 6 of 70/30. These were fed into a spinning pack, spun out at a spinneret temperature of 290° C., wound up at a rate of 500 m/min and then drawn to obtain a multi-layered splittable fiber having an alternate laminate structure of PET and nylon 6 and having a single fiber fineness of 3.0 dtex. In the cross section of the thus-obtained splittable fiber, 11 layers of PET (6 layers) and nylon 6 (5 layers) were alternated. After drawn, the fiber was mechanically crimped and cut into 51-mm staple fibers. Thus obtained, the staple fibers were carded and cross-wrapped to give a web. Then, this was needle-punched at a frequency of 1600 punches/cm$^2$ to be a fibers-entangled nonwoven fabric. Next, this was dipped in a hot water bath at 90° C. and shrunk. Its degree of shrinkage [((length of nonwoven fabric before shrunk−length of nonwoven fabric after shrunk)/length of nonwoven fabric before shrunk)×100] was 16% in the machine direction and 17% in the cross direction. Thus shrunk, the nonwoven fabric was dried and then pressed at 160° C. to obtain a fibrous substrate having an apparent density of 0.23 g/cm$^3$, constituted ultrafine fibers-forming fibers having a laminate cross section. (This is hereinafter referred to as nonwoven fabric (A).)

Reference Example 2

Nylon 6 serving as islands component, and an alkali-soluble PET serving as a sea component were melt-extruded through different extruders and separately metered each via a gear pump to be in a ratio by mass, nylon 6/alkali-soluble PET of 60/40. These were fed into a spinning pack with a fiber shape-defining spinneret, spun out at a spinneret temperature of 270° C., and wound up at a rate of 500 m/min. After thus spun, this was drawn to be a bicomponent fiber having a single fiber fineness of 3.0 dtex and having a sea-islands cross section. The cross section of the fiber had a sea-islands profile, in which the number of islands was 25. After drawn, the fiber was mechanically crimped and cut into 51-mm staple fibers. Thus obtained, the staple fibers were carded and cross-wrapped to give a web. Then, this was needle-punched at a frequency of 1200 punches/cm$^2$ to be a fibers-entangled nonwoven fabric. Next, this was dipped in a hot water bath at 90° C. and shrunk. Its degree of shrinkage [((length of nonwoven fabric before shrunk−length of nonwoven fabric after shrunk)/length of nonwoven fabric before shrunk)×100] was 10% in the machine direction and 11% in the cross direction. Thus shrunk, the nonwoven fabric was dried and then pressed at 160° C. to obtain a fibrous substrate having an apparent density of 0.29 g/cm$^3$, constituted ultrafine fibers-forming fibers having a sea-islands cross section. (This is hereinafter referred to as nonwoven fabric (B).)

Reference Example 3

An IPA-modified PET serving as an island component, and an ethylene-copolymerized PVA serving as a sea component were melt-extruded through different extruders and separately metered each via a gear pump to be in a ratio by mass, IPA-modified PET/ethylene-copolymerized PVA of 60/40. These were fed into a spinning pack with a fiber shape-defining spinneret, spun out at a spinneret temperature of 260° C., and wound up at a rate of 500 m/min. After thus spun, this was drawn to be a sea-islands fiber having a single fiber fineness of 3.0 dtex. The cross section of the fiber had a sea-islands profile, in which the number of islands was 25. After drawn, the fiber was mechanically crimped and cut into 51-mm stable fibers. Thus obtained, the stable fibers were carded and cross-wrapped to give a web. Then, this was needle-punched at a frequency of 1200 punches/cm$^2$ to be a fibers-entangled nonwoven fabric. Next, this was dipped in a hot water bath at 90° C. and shrunk. Its degree of shrinkage [((length of nonwoven fabric before shrunk−length of nonwoven fabric after shrunk)/length of nonwoven fabric before shrunk)×100] was 18% in the machine direction and 17% in the cross direction. Thus shrunk, the nonwoven fabric was dried and then pressed at 180° C. to obtain a fibrous substrate having an apparent density of 0.27 g/cm$^3$, constituted ultrafine fibers-forming fibers having a sea-islands cross section. (This is hereinafter referred to as nonwoven fabric (C).)

Reference Example 4

PET fibers (having a single fiber fineness of 2 dtex and a fiber length of 51 mm) were carded and cross-wrapped into a web. Then, this was needle-punched at a frequency of 700 punches/cm$^2$ to be a fibers-entangled nonwoven fabric. Next, this was dipped in a hot water bath at 70° C. and shrunk. Its degree of shrinkage [((length of nonwoven fabric before shrunk−length of nonwoven fabric after shrunk)/ length of nonwoven fabric before shrunk)×100] was 25% in the machine direction and 23% in the cross direction. Thus shrunk, the nonwoven fabric was dried and then pressed at 160° C. to obtain a fibrous substrate having an apparent density of 0.28 g/cm³. (This is hereinafter referred to as nonwoven fabric (D).)

Production of Polymer(b):

Reference Example 5

480 g of distilled water was put into a flask equipped with a condenser tube, heated up to 80° C., and then well purged with nitrogen. 81.9 g of DEGMA, 37.8 g of TEGMA, 6.30 g of ethyl acrylate and 1.26 g of n-octanethiol were added to it, and stirred for 20 minutes, and then an aqueous solution of 0.13 g of potassium persulfate and 3.8 g of distilled water was added thereto and kept at 80° C. for 30 minutes. Next, an aqueous solution of 0.13 g of potassium persulfate and 3.8 g of distilled water was added to it, and after 5 minutes, a mixture of 54.6 g of DEGMA, 25.2 g of TEGMA and 4.20 g of ethyl acrylate was dropped into the flask via a dropping funnel over a period of 180 minutes. After the addition, an aqueous solution of 0.04 g of potassium persulfate and 1.3 g of distilled water was added to it, and kept at 80° C. for 180 minutes to complete the polymerization. Further, water was removed from the reaction system via a rotary evaporator, and a polymer having a polyoxyethylene group in its side chains was obtained. (This is herein after referred to as polymer bi.) The value, $\alpha+\beta\times20000$ of this polymer, derived from the percentage, % by mass ($\alpha$) of the polyoxyethylene group in the polymer and the number of mols ($\beta$) of the amino group per gram of the polymer, was 49; the proportion of the polyoxyethylene group-having ethylenic unsaturated monomer in the ethylenic unsaturated monomer component of the polymer bi was 95% by mass; the number-average number of the repetitions of the oxyethylene unit in the polymer was 2.5; and the clouding point of an aqueous 10% solution of the polymer was 35° C.

Reference Example 6

490 g of distilled water was put into a flask equipped with a condenser tube, heated up to 75° C., and then well purged with nitrogen. 94.5 g of DEGMA, 31.5 g of TEGMA, 2.52 g of 1-thioglycerol and 0.38 g of dimethyl 2,2'-azobisisobutyrate were added to it, and stirred for 60 minutes, and then a mixture of 63.0 g of DEGMA and 21.0 g of TEGMA was dropped into the flask via a dropping funnel over a period of 180 minutes. Then, this was kept at 75° C. for 180 minutes to complete the polymerization. Further, water was removed from the reaction system via a rotary evaporator, and a polymer having a polyoxyethylene group in its side chains was obtained. (This is hereinafter referred to as polymer bii.) The value, $\alpha+\beta\times20000$ of this polymer, derived from the percentage, % by mass ($\alpha$) of the polyoxyethylene group in the polymer and the number of mols ($\beta$) of the amino group per gram of the polymer, was 50; the proportion of the polyoxyethylene group-having ethylenic unsaturated monomer in the ethylenic unsaturated monomer component of the polymer bii was 100% by mass; the number-average number of the repetitions of the oxyethylene unit in the polymer was 2.4; and the clouding point of an aqueous 10% solution of the polymer was 32° C.

Reference Example 7

480 g of distilled water was put into a flask equipped with a condenser tube, heated up to 80° C., and then well purged with nitrogen. 107.1 g of DEGMA, 18.9 g of PEG(9)MA and 1.26 g of n-octanethiol were added to it, and stirred for 20 minutes, and then an aqueous solution of 0.13 g of potassium persulfate and 3.8 g of distilled water was added thereto and kept at 80° C. for 30 minutes. Next, an aqueous solution of 0.13 g of potassium persulfate and 3.8 g of distilled water was added to it, and after 5 minutes, a mixture of 71.4 g of DEGMA and 12.6 g of PEG(9)MA was dropped into the flask via a dropping funnel over a period of 180 minutes. After the addition, an aqueous solution of 0.04 g of potassium persulfate and 1.3 g of distilled water was added to it, and kept at 80° C. for 180 minutes to complete the polymerization. Further, water was removed from the reaction system via a rotary evaporator, and a polymer having a polyoxyethylene group in its side chains was obtained. (This is hereinafter referred to as polymer biii.) The value, $\alpha+\beta\times20000$ of this polymer, derived from the percentage, % by mass ($\alpha$) of the polyoxyethylene group in the polymer and the number of mols ($\beta$) of the amino group per gram of the polymer, was 52; the proportion of the polyoxyethylene group-having ethylenic unsaturated monomer in the ethylenic unsaturated monomer component of the polymer biii was 100% by mass; the number-average number of the repetitions of the oxyethylene unit in the polymer was 2.4; and the clouding point of an aqueous 10% solution of the polymer was 36° C.

Reference Example 8

480 g of distilled water was put into a flask equipped with a condenser tube, heated up to 80° C., and then well purged with nitrogen. 94.5 g of TEGMA, 30.2 g of methyl methacrylate, 1.26 g of N,N-dimethylaminoethyl methacrylate and 1.26 g of n-octanethiol were added to it, and stirred for 20 minutes, and then an aqueous solution of 0.13 g of potassium persulfate and 3.8 g of distilled water was added thereto and kept at 80° C. for 30 minutes. Next, an aqueous solution of 0.13 g of potassium persulfate and 3.8 g of distilled water was added to it, and after 5 minutes, a mixture of 63.0 g of TEGMA, 20.2 g of methyl methacrylate and 0.84 g of N,N-dimethylaminoethyl methacrylate was dropped into the flask via a dropping funnel over a period of 180 minutes. After the addition, an aqueous solution of 0.04 g of potassium persulfate and 1.3 g of distilled water was added to it, and kept at 80° C. for 180 minutes to complete the polymerization. Further, water was removed from the reaction system via a rotary evaporator, and a polymer having a polyoxyethylene group in its side chains was obtained. (This is hereinafter referred to as polymer biv.) The value, $\alpha+\beta\times20000$ of this polymer, derived from the percentage, % by mass ($\alpha$) of the polyoxyethylene group in the polymer and the number of mols ($\beta$) of the amino group per gram of the polymer, was 49; the proportion of the polyoxyethylene group-having ethylenic unsaturated monomer in the ethylenic unsaturated monomer component of the polymer biv was 75% by mass; the number-average number of the repetitions of the oxyethylene unit in the polymer was 4.0; and the clouding point of an aqueous 10% solution of the polymer was 44° C.

Reference Example 9

360 g of 2-butanone was put into a flask equipped with a condenser tube, heated up to 70° C., and then well purged with nitrogen. 72.0 g of TEGMA, 72.0 g of DEGMA and 1.20 g of 1-thioglycerol were added to it, and stirred for 20 minutes. Then, a solution of 0.36 g of dimethyl 2,2'-azobisisobutyrate and 18 g of 2-butanone was added thereto, and after 5 minutes, a mixture of 48.0 g of TEGMA and 48.0 g of DEGMA was dropped into the flask via a dropping funnel over a period of 240 minutes. After the addition, this was kept at 70° C. for 240 minutes to complete the polymerization. Then, 2-butanone was removed from the reaction system via a rotary evaporator, and a polymer having a polyoxyethylene group in its side chains was obtained. (This is hereinafter referred to as polymer bv.) The value, $\alpha+\beta\times20000$ of this polymer, derived from the percentage, % by mass ($\alpha$) of the polyoxyethylene group in the polymer and the number of mols ($\beta$) of the amino group per gram of the polymer, was 55; the proportion of the polyoxyethylene group-having ethylenic unsaturated monomer in the ethylenic unsaturated monomer component of the polymer bv was 100% by mass; the number-average number of the repetitions of the oxyethylene unit in the polymer was 2.8; and the clouding point of an aqueous 10% solution of the polymer was 43° C.

Reference Example 10

360 g of 2-butanone was put into a flask equipped with a condenser tube, heated up to 70° C., and then well purged with nitrogen. 72.0 g of PEG(9)MA, 72.0 g of 2-hydroxyethyl methacrylate and 2.40 g of 1-thioglycerol were added to it, and stirred for 20 minutes. Then, a solution of 0.36 g of dimethyl 2,2'-azobisisobutyrate and 18 g of 2-butanone was added thereto, and after 5 minutes, a mixture of 48.0 g of PEG(9)MA and 48.0 g of 2-hydroxyethyl methacrylate was dropped into the flask via a dropping funnel over a period of 240 minutes. After the addition this was kept at 70° C. for 240 minutes to complete the polymerization. Then, 2-butanone was removed from the reaction system via a rotary evaporator, and a polymer having a polyoxyethylene group in its side chains was obtained. (This is hereinafter referred to as polymer bvi.) The value, $\alpha+\beta\times20000$ of this polymer, derived from the percentage, % by mass ($\alpha$) of the polyoxyethylene group in the polymer and the number of mols ($\beta$) of the amino group per gram of the polymer, was 40; the proportion of the polyoxyethylene group-having ethylenic unsaturated monomer in the ethylenic unsaturated monomer component of the polymer bvi was 50% by mass; the number-average number of the repetitions of the oxyethylene unit in the polymer was 9.0; and the clouding point of an aqueous 10% solution of the polymer was 95° C.

Reference Example 11

360 g of 2-butanone was put into a flask equipped with a condenser tube, heated up to 70° C., and then well purged with nitrogen. 93.6 g of DEGMA, 50.4 g of 2-hydroxyethyl methacrylate and 2.40 g of 1-thioglycerol were added to it, and stirred for 20 minutes. Then, a solution of 0.36 g of dimethyl 2,2'-azobisisobutyrate and 18 g of 2-butanone was added thereto, and after 5 minutes, a mixture of 62.4 g of DEGMA and 33.6 g of 2-hydroxyethyl methacrylate was dropped into the flask via a dropping funnel over a period of 240 minutes. After the addition, this was kept at 70° C. for 240 minutes to complete the polymerization. Then, 2-butanone was removed from the reaction system via a rotary evaporator, and a polymer having a polyoxyethylene group in its side chains was obtained. (This is hereinafter referred to as polymer bvii.) The value, $\alpha+\beta\times20000$ of this polymer, derived from the percentage, % by mass ($\alpha$) of the polyoxyethylene group in the polymer and the number of mols ($\beta$) of the amino group per gram of the polymer, was 30; the proportion of the polyoxyethylene group-having ethylenic unsaturated monomer in the ethylenic unsaturated monomer component of the polymer bvii was 65% by mass; the number-average number of the repetitions of the oxyethylene unit in the polymer was 2.0; and the clouding point of an aqueous 10% solution of the polymer was 22° C.

Reference Example 12

360 g of 2-butanone was put into a flask equipped with a condenser tube, heated up to 70° C., and then well purged with nitrogen. 43.2 g of DEGMA, 100.8 g of PEG(9)MA and 1.20 g of 1-thioglycerol were added to it, and stirred for 20 minutes. Then, a solution of 0.36 g of dimethyl 2,2'-azobisisobutyrate and 18 g of 2-butanone was added thereto, and after 5 minutes, a mixture of 28.8 g of DEGMA and 67.2 g of PEG(9)MA was dropped into the flask via a dropping funnel over a period of 240 minutes. After the addition, this was kept at 70° C. for 240 minutes to complete the polymerization. Then, 2-butanone was removed from the reaction system via a rotary evaporator, and a polymer having a polyoxyethylene group in its side chains was obtained. (This is hereinafter referred to as polymer bvii.) The value, $\alpha+\beta\times20000$ of this polymer, derived from the percentage, % by mass ($\alpha$) of the polyoxyethylene group in the polymer and the number of mols ($\beta$) of the amino group per gram of the polymer, was 70; the proportion of the polyoxyethylene group-having ethylenic unsaturated monomer in the ethylenic unsaturated monomer component of the polymer bviii was 100% by mass; the number-average number of the repetitions of the oxyethylene unit in the polymer was 5.3; and the clouding point of an aqueous 10% solution of the polymer was 75° C.

Reference Example 13

360 g of 2-butanone was put into a flask equipped with a condenser tube, heated up to 70° C., and then well purged with nitrogen. 43.2 g of DEGMA, 72.0 g of TEGMA, 28.8 g of N,N-dimethylaminoethyl methacrylate and 2.40 g of 1-thioglycerol were added to it, and stirred for 20 minutes. Then, a solution of 0.36 g of dimethyl 2,2'-azobisisobutyrate and 18 g of 2-butanone was added thereto, and after 5 minutes, a mixture of 28.8 g of DEGMA, 48.0 g of TEGMA and 19.2 g of N,N-dimethylaminoethyl methacrylate was dropped into the flask via a dropping funnel over a period of 240 minutes. After the addition, this was kept at 70° C. for 240 minutes to complete the polymerization. Then, 2-butanone was removed from the reaction system via a rotary evaporator, and a polymer having a polyoxyethylene group in its side chains was obtained. (This is hereinafter referred to as polymer bix.) The value, $\alpha+\beta\times20000$ of this polymer, derived from the percentage, % by mass ($\alpha$) of the polyoxyethylene group in the polymer and the number of mols ($\beta$) of the amino group per gram of the polymer, was 71; the proportion of the polyoxyethylene group having ethylenic unsaturated monomer in the ethylenic unsaturated monomer component of the polymer bix was 80% by mass; the number-average number of the repetitions of the oxyethylene unit in the polymer was 3.1; and the clouding point of an aqueous 10% solution of the polymer was 41° C.

Reference Example 14

360 g of 2-butanone was put into a flask equipped with a condenser tube, heated up to 70° C., and then well purged with nitrogen. 122.4 g of TEGMA, 21.6 g of N,N-dimethylaminoethyl methacrylate and 1.2.0 g of 1-thioglycerol were added to it, and stirred for 20 minutes. Then, a solution of 0.36 g of dimethyl 2,2'-azobisisobutyrate and 18 g of 2-butanone was added thereto, and after 5 minutes, a mixture of 81.6 g of TEGMA and 14.4 g of N,N-dimethylaminoethyl methacrylate was dropped into the flask via a dropping funnel over a period of 240 minutes. After the addition, this was kept at 70° C. for 240 minutes to complete the polymerization. Then, 2-butanone was removed from the reaction system via a rotary evaporator, and a polymer having a polyoxyethylene group in its side chains was obtained. (This is hereinafter referred to as polymer bx.) The value, $\alpha+\beta\times 20000$ of this polymer, derived from the percentage, % by mass ($\alpha$) of the polyoxyethylene group in the polymer and the number of mols ($\beta$) of the amino group per gram of the polymer, was 73; the proportion of the polyoxyethylene group-having ethylenic unsaturated monomer in the ethylenic unsaturated monomer component of the polymer bx was 85% by mass; the number-average number of the repetitions of the oxyethylene unit in the polymer was 4.0; and the clouding point of an aqueous 10% solution of the polymer was 65° C.

Production of Aqueous Dispersion of Urethane Resin (a1):

Reference Example 15

200 g of PTMG, 100 g of PHC, 3.71 g of 2,2-dimethylolbutanoic acid and 55.4 g of 2,4-tolylene diisocyanate were put into a flask, and stirred in a dry nitrogen atmosphere at 90° C. for 2 hours so that the hydroxyl group in the system was quantitatively reacted to give an isocyanate-terminated prepolymer. 186 g of 2-butanone was added to it and uniformly stirred, and then the temperature inside the flask was lowered to 40° C. With that, 2.46 g of triethylamine was added to it and stirred for 10 minutes. Next, an aqueous solution prepared by dissolving 11.4 g of EM120 and 3.79 g of ECT, which serve as emulsifier (surfactant), in 299 g of distilled water was added to the prepolymer and stirred to emulsify the prepolymer for 1 minute by the use of a homomixer. Immediately, an aqueous solution prepared by dissolving 12.8 g of piperazine 6-hydrate and 4.52 g of diethylenetriamine in 162 g of distilled water was added to the emulsion, and this was further stirred for 1 minute by the use of a homomixer for chain extension. After it, 2-butanone was removed from the reaction system via a rotary evaporator, and an aqueous urethane resin dispersion having a resin concentration of 45% by mass (this contains urethane resin (a1) and surfactant (c)) was obtained. (This is hereinafter referred to as aqueous urethane resin dispersion <1>.) The aqueous urethane resin dispersion <1> contains 6.8 mmols, per 100 g of the urethane resin therein, of a carboxyl group in the urethane resin skeleton.

Reference Example 16

200 g of PTMG, 100 g of PHC and 52.5 g of 2,4-tolylene diisocyanate were put into a flask, and stirred in a dry nitrogen atmosphere at 90° C. for 2 hours so that the hydroxyl group in the system was quantitatively reacted to give an isocyanate-terminated prepolymer. 182 g of 2-butanone was added to it and uniformly stirred, and then the temperature inside the flask was lowered to 40° C. Next, an aqueous solution prepared by dissolving 18.5 g of EM120 and 3.71 g of ECT, which serve as emulsifier (surfactant), in 299 g of distilled water was added to the prepolymer and stirred to emulsify the prepolymer for 1 minute by the use of a homomixer. Immediately, an aqueous solution prepared by dissolving 13.5 g of piperazine 6-hydrate and 4.79 g of diethylenetriamine in 160 g of distilled water was added to the emulsion, and this was further stirred for 1 minute by the use of a homomixer for chain extension. After it, 2-butanone was removed from the reaction system via a rotary evaporator, and an aqueous urethane resin dispersion having a resin concentration of 45% by mass (this contains urethane resin (a1) and surfactant (c)) was obtained.(This is hereinafter referred to as aqueous urethane resin dispersion <2>.) The aqueous urethane resin dispersion <2> does not contain a carboxyl group in the urethane resin skeleton.

Reference Example 17

200 g of PTMG, 100 g of PHC, 8.44 g of 2,2-dimethylolbutanoic acid and 61.9 g of 2,4-tolylene diisocyanate were put into a flask, and stirred in a dry nitrogen atmosphere at 90° C. for 2 hours so that the hydroxyl group in the system was quantitatively reacted to give an isocyanate-terminated prepolymer. 193 g of 2-butanone was added to it and uniformly stirred, and then the temperature inside the flask was lowered to 40° C. With that, 5.59 g of triethylamine was added to it and stirred for 10 minutes. Next, an aqueous solution prepared by dissolving 3.94 g of sodium laurylsulfate and 3.94 g of ECT, which serve as emulsifier (surfactant), in 433 g of distilled water was added to the prepolymer and stirred to emulsify the prepolymer for 1 minute by the use of a homomixer. Immediately, an aqueous solution prepared by dissolving 13.3 g of piperazine 6hydrate and 4.70 g of diethylenetriamine in 291 g of distilled water was added to the emulsion, and this was further stirred for 1 minute by the use of a homomixer for chain extension. After it, 2-butanone was removed from the reaction system via a rotary evaporator, and an aqueous urethane resin dispersion having a resin concentration of 35% by mass (this contains urethane resin (a1) and surfactant (c)) was obtained. (This hereinafter referred to as aqueous urethane resin dispersion <3>.) The aqueous urethane resin dispersion <3> contains 15.0 mmols, per 100 g of the urethane resin therein, of a carboxyl group in the urethane resin skeleton.

Reference Example 18

300 g of PTMG, 19.56 g of 2,2-dimethylolbutanoic acid and 101.7 g of isophorone diisocyanate were put into a flask, and stirred in a dry nitrogen atmosphere at 90° C. for 3 hours so that the hydroxyl group in the system was quantitatively reacted to give an isocyanate-terminated prepolymer. 223 g of 2-butanone was added to it and uniformly stirred, and then the temperature inside the flask was lowered to 40° C. With that, 13.0 g of triethylamine was added to it and stirred for 20 minutes. Next, 408 g of distilled water alone with no surfactant (emulsifier) therein was added to the prepolymer and stirred to emulsify the prepolymer. Then, an aqueous solution prepared by dissolving 15.7 g of piperazine 6-hydrate and 5.55 g of diethylenetriamine in 243 g of distilled water was added to the emulsion for chain extension. After it, 2-butanone was removed from the reaction system via a rotary evaporator, and an aqueous urethane resin dispersion having a resin concentration of 40% by mass (this contains urethane resin (a1) but not surfactant (c)) was obtained. (This is hereinafter referred to as aqueous urethane resin dispersion <4>.) The aqueous urethane resin dispersion <4> contains 30.4 mmols, per 100 g of the urethane resin therein, of a carboxyl group in the urethane resin skeleton.

Production of Aqueous Dispersion of Urethane Acrylic Composite Resin (a2):

Reference Example 19

514 g of the aqueous urethane resin dispersion <3> obtained in Reference Example 17, 0.008 g of ferrous sulfate 7-hydrate, 0.63 g of potassium pyrophosphate, 0.97 g of Rongalit (formaldehyde sodium sulfoxylate 2-hydrate), 0.021 g of disodium ethylenediaminetetraacetate and 249 g of distilled water were put into a flask equipped with a condenser tube, heated up to 40° C., and well purged with nitrogen. Next, a mixture of 349.2 g of n-butyl acrylate, 7.2 g of 1,6-hexanediol diacrylate, 3.6 g of allyl methacrylate and 1.08 g of ECT, and an emulsion of 0.65 g of cumene hydroperoxide, 0.32 g of ECT and 13 g of distilled water were separately dropped into the flask via different dropping funnels over a period of 270 minutes. After the addition, this was kept at 40° C. for 30 minutes. Next, a mixture of 58.8 g of methyl methacrylate, 1.2 g of 1,6-hexanediol diacrylate and 0.18 g of ECT, and an emulsion of 0.12 g of cumeme hydroperoxide, 0.06 g of ECT and 2.4 g of distilled water were separately dropped into the flask via different dropping funnels over a period of 60 minutes. After the addition, this was kept at 40° C. for 60 minutes to complete the polymerization, and an aqueous urethane-acrylic composite resin dispersion having a solid resin concentration of 50% by mass (this contains urethane-acrylic composite resin (a2) and surfactant (c)) was obtained. (This is hereinafter referred to as aqueous urethane-acrylic composite resin dispersion <1>.) The aqueous urethane-acrylic composite resin dispersion <1> contains 4.5 mmols, per 100 g of the urethane-acrylic composite resin therein, of a carboxyl group in the urethane-acrylic composite resin skeleton.

Reference Example 20

600 g of the aqueous urethane resin dispersion <4> obtained in Reference Example 18, 0.003 g of ferrous sulfate 7-hydrate, 0.24 g of potassium pyrophosphate, 0.37 g of Rongalit (formaldehyde sodium sulfoxylate 2-hydrate), 0.008 g of disodium ethylenediaminetetraacetate and 33 g of distilled water were put into a flask equipped with a condenser tube, heated up to 40° C., and well purged with nitrogen. Next, a mixture of 156.8 g of n-butyl acrylate, 3.2 g of 1,6-hexanediol diacrylate and 0.48 g of ECT, and an emulsion of 0.32 g of cumene hydroperoxide, 0.16 g of ECT and 6.4 g of distilled water were separately dropped into the flask via different dropping funnels over a period of 180 minutes. After the addition, this was kept at 40° C. for 60 minutes to complete the polymerization, and an aqueous urethane-acrylic composite resin dispersion having a solid resin concentration of 50% by mass (this contains urethane-acrylic composite resin (a2) and surfactant (c)) was obtained. (This is hereinafter referred to as aqueous urethane-acrylic composite resin dispersion <2>.) The aqueous urethane-acrylic composite resin dispersion <2> contains 18.2 mmols, per 100 g of the urethane-acrylic composite resin therein, of a carboxyl group in the urethane-acrylic composite resin skeleton.

Example 1

An aqueous solution prepared by dissolving 3 parts of the polymer bi of Reference Example 5 in 7 parts of distilled water was added to 100 parts of the aqueous urethane resin dispersion <1> produced in Reference Example 15 (containing urethane resin (a1) and surfactant (c)) to obtain an aqueous dispersion having an urethane resin concentration of 41% by mass. The heat-sensitive gelling time of this aqueous dispersion kept at 70° C. was 7 minutes; and the viscosity increase in the dispersion kept at 40° C. for 2 weeks was 9%. Immediately after its preparation, the aqueous resin dispersion was infiltrated into the nonwoven fabric (A) prepared in Reference Example 1 in such a controlled manner that 60 parts of the urethane resin could be in 100 parts of the nonwoven fabric. Then, this was wholly sprayed with steam under a pressure of 1.5 kg/cm$^2$ so that the aqueous resin dispersion therein was heat-sensitive gelled. Further, this was dried in a hot air drier at 140° C. for 30 minutes. Next, this was pressed with a roller heated at 160° C. to smooth its surface and to regulate its thickness, and a fibrous substrate having a thickness of about 1 mm was thus obtained. Next, in a circular jet-dyeing machine, this was processed with an aqueous sodium hydroxide (10 g/liter) solution at 80° C. for 60 minutes whereby the splittable fibers that constitute the fibrous substrate were split (into ultrafine fibers having a mean fineness of 0.32 dtex). Further in the circular jet-dyeing machine, this was washed to remove sodium hydroxide. After dried, this was a leather-like sheet having an apparent density of 0.48. As in Table 2, the sheet had a good feel and a high tear strength.

The aqueous resin dispersion was kept at 40° C. for 2 weeks, and then used in the same process as herein. This gave a leather-like sheet having an apparent density of 0.48. As in Table 2, the sheet had a good feel and a high tear strength.

Example 2

An aqueous solution prepared by dissolving 2 parts of the polymer bi of Reference Example 5 and 1 part of a surfactant, EM120 in 8, parts of distilled water was added to 100 parts of the aqueous urethane-acrylic composite resin dispersion <1> produced in Reference Example 19 (containing urethane-acrylic composite resin (a2) and surfactant (c)) to obtain an aqueous dispersion having an urethane-acrylic composite resin concentration of 45% by mass. The heat-sensitive gelling time of this aqueous dispersion kept at 70° C. was 4 minutes; and the viscosity increase in the dispersion kept at 40° C. for 2 weeks was 4%. Immediately after its preparation, the aqueous resin dispersion was infiltrated into the nonwoven fabric (B) prepared in Reference Example 2 in such a controlled manner that 40 parts of the urethane-acrylic composite resin could be in 100 parts of the nonwoven fabric. Then, this was dipped in a hot water bath at 90° C. to heat-sensitive gel the aqueous resin dispersion therein, and then dried in a hot air drier at 140° C. for 30 minutes. Next, this was pressed with a roller heated at 160° C. to smooth its surface and to regulate its thickness, and a fibrous substrate having a thickness of about 1 mm was thus obtained. Next, the fibrous substrate was dipped in an aqueous sodium hydroxide (40 g/liter) solution controlled at 95° C. and then squeezed with rollers. This operation was repeated to decompose and remove the alkali-soluble PET, the sea component of the sea-islands biocomponent fibers of the fibrous substrate, whereby the fibers were converted into ultrafine fibers into ultrafine fibers (having a mean fineness of 0.082 dtex). The leather-like sheet thus fabricated had an apparent density of 0.43. As in Table 2, the sheet had a good feel and a high tear strength.

The aqueous resin dispersion was kept at 40° C. for 2 weeks, and then used in the same process as herein. This gave a leather-like sheet having an apparent density of 0.44. As in Table 2, the sheet had a good feel and a high tear strength.

Example 3

An aqueous solution prepared by dissolving 2 parts of the polymer bii of Reference Example 6 and 2 parts of a surfactant, EM109P in 21 parts of distilled water was added to 100 parts of the aqueous urethane-acrylic composite resin dispersion <1> produced in Reference Example 19 (containing urethane-acrylic composite resin (a2) and surfactant (c)) to obtain an aqueous dispersion having an urethane-acrylic composite resin concentration of 40% by mass. The heat-sensitive gelling time of this aqueous dispersion kept at 70° C. was 6 minutes; and the viscosity increase in the dispersion kept at 40° C. for 2 weeks was 3%. Immediately after its preparation, the aqueous resin dispersion was infiltrated into the nonwoven fabric (C) prepared in Reference Example 3 in such a controlled manner that 40 parts of the urethane-acrylic composite resin could be in 100 parts of the nonwoven fabric. Then, the aqueous resin dispersion in this was heat-sensitive gelled in an atmosphere at 70° C. and a relative humidity of 95%, and then this was dried in a hot air drier at 140° C. for 30 minutes. Next, this was pressed with a roller heated at 160° C. to smooth its surface and to regulate its thickness, and a fibrous substrate having a thickness of about 1 mm was thus obtained. Next, the fibrous substrate was dipped in hot water at 95° C. and then squeezed with rollers. This operation was repeated to dissolve and remove the ethylene-copolymerized PVA, the sea component of the sea-islands bicomponent fibers of the fibrous substrate, whereby the fibers were converted into ultrafine fibers (having a mean fineness of 0.087 dtex). The leather-like sheet thus fabricated had an apparent density of 0.42. As in Table 2, the sheet had a good feel and a high tear strength.

The aqueous resin dispersion was kept at 40°C. for 2 weeks, and then used in the same process as herein. This gave a leather-like sheet having an apparent density of 0.42. As in Table 2, the sheet had a good feel and a high tear strength.

Example 4

An aqueous solution prepared by dissolving 3 parts of the polymer biii of Reference Example 7 and 1 part of a surfactant, EM147 in 7 parts of distilled water was added to 100 parts of the aqueous urethane-acrylic composite resin dispersion <1> produced in Reference Example 19 (containing urethane-acrylic composite resin (a2) and surfactant (c)) to obtain an aqueous dispersion having an urethane-acrylic composite resin concentration of 45% by mass. The heat-sensitive gelling time of this aqueous dispersion kept at 70° C. was 5 minutes; and the viscosity increase in the dispersion kept at 40° C. for 2 weeks was 7%. Immediately after its preparation, the aqueous resin dispersion was infiltrated into the nonwoven fabric (A) prepared in Reference Example 1 in such a controlled manner that 60 parts of the urethane-acrylic composite resin could be in 100 parts of the nonwoven fabric. Then, this was dipped in a hot water bath at 90° C. to heat-sensitive gel the aqueous resin dispersion therein. Further, this was dried in a hot air drier at 140° C. for 30 minutes. Next, this was pressed with a roller heated at 160° C. to smooth its surface and to regulate its thickness, and a fibrous substrate having a thickness of about 1 mm was thus obtained. Next, in a circular jet-dyeing machine, this was processed with an aqueous sodium hydroxide (10 g/liter) solution at 80° C. for 60 minutes whereby the splittable fibers that constitute the fibrous substrate were split (into ultrafine fibers having a mean fineness of 0.32 dtex). Further in the circular jet-dyeing machine, this was washed to remove sodium hydroxide. After dried, this was a leather-like sheet having an apparent density of 0.48. As in Table 2, the sheet had a good feel and a high tear strength.

The aqueous resin dispersion was kept at 40° C. for 2 weeks, and then used in the same process as herein. This gave a leather-like sheet having an apparent density of 0.47. As in Table 2, the sheet had a good feel and a high tear strength.

Example 5

An aqueous solution prepared by dissolving 4 parts of the polymer biv of Reference Example 8 and 0.1 parts of an inorganic metal salt, sodium sulfate in 7 parts of distilled water was added to 100 parts of the aqueous urethane-acrylic composite resin dispersion <1> produced in Reference Example 19 (containing urethane-acrylic composite resin (a2) and surfactant (c)) to obtain an aqueous dispersion having an urethane acrylic composite resin concentration of 45% by mass. The heat-sensitive gelling time of this aqueous dispersion kept at 70° C. was 5 minutes; and the viscosity increase in the dispersion kept at 40° C. for 2 weeks was 9%. Immediately after its preparation, the aqueous resin dispersion was infiltrated into the nonwoven fabric (B) prepared in Reference Example 2 in such a controlled manner that 40 parts of the urethane-acrylic composite resin could be in 100 parts of the nonwoven fabric. Then, this was wholly sprayed with steam under a pressure of 1.5 kg/cm$^2$ so that the aqueous resin dispersion therein was heat-sensitive gelled. Further, this was dried in a hot air drier at 140° C. for 30 minutes. Next, this was pressed with a roller heated at 160° C. to smooth its surface and to regulate its thickness, and a fibrous substrate having a thickness of about 1 mm was thus obtained. Next, the fibrous substrate was dipped in an aqueous sodium hydroxide (40 g/liter) solution controlled at 95° C. and then squeezed with rollers. This operation was repeated to decompose and remove the alkali-soluble PET, the sea component of the sea-islands bicomponentfibers of the fibrous substrate, whereby the fibers were converted into ultrafine fibers (having a mean fineness of 0.082 dtex). The leather-like sheet thus fabricated had an apparent density of 0.43. As in Table 2, the sheet had a good feel and a high tear strength.

The aqueous resin dispersion was kept at 40° C. for 2 weeks, and then used in the same process as herein. This gave a leather-like sheet having an apparent density of 0.43. As in Table 2, the sheet had a good feel and a high tear strength.

Example 6

An aqueous solution prepared by dissolving 5 parts of the polymer bv of Reference Example 9 and 0.2 parts of an inorganic metal salt, sodium chloride in 13 parts of distilled water was added to 100 parts of the aqueous urethane resin dispersion <1> produced in Reference Example 15 (containing urethane resin (a1) and surfactant (c)) to obtain an aqueous dispersion having an urethane resin concentration of 38% by mass. The heat-sensitive gelling time of this aqueous dispersion kept at 70° C. was 6 minutes; and the viscosity increase in the dispersion kept at 40° C. for 2 weeks was 12%. Immediately after its preparation, the aqueous resin dispersion was infiltrated into the nonwoven fabric (D) prepared in Reference Example 4 in such a controlled manner that 70 parts of the urethane resin could be in 100 parts of the nonwoven fabric. Next, this was dipped in a hot water bath at 90° C. to heat-sensitive gel the aqueous resin dispersion therein. After dried in a hot air drier at 140° C. for 30 minutes, this gave a leather-like sheet having an apparent density of 0.51. As in Table 2, the sheet had a good feel and a high tear strength.

The aqueous resin dispersion was kept at 40° C. for 2 weeks, and then used in the same process as herein. This gave a leather-like sheet having an apparent density of 0.50. As in Table 2, the sheet had a good feel and a high tear strength.

Example 7

An aqueous solution prepared by dissolving 2 parts of the polymer bv of Reference Example 9 and 1 part of a surfactant, EM109P in 8 parts of distilled water was added to 100 parts of the aqueous urethane-acrylic composite resin dispersion <1> produced in Reference Example 19 (containing urethane-acrylic composite resin (a2) and surfactant (c)) to obtain an aqueous dispersion having an urethane-acrylic composite resin concentration of 45 by mass. The heat-sensitive gelling time of this aqueous dispersion kept at 70° C. was 4 minutes; and the viscosity increase in the dispersion kept at 40° C. for 2 weeks was 10%. Immediately after its preparation, the aqueous resin dispersion was infiltrated into the nonwoven fabric (D) prepared in Reference Example 4 in such a controlled manner that 70 parts of the urethane-acrylic composite resin could be in 100 parts of the nonwoven fabric. This was heated and heat-sensitive gelled in a hot air drier at 140° C. for 40 minutes, heat-sensitive gelled and dried and this gave a leather-like sheet having an apparent density of 0.48. As in Table 2, the sheet had a good feel and a high tear strength.

The aqueous resin dispersion was kept at 40° C. for 2 weeks, and then used in the same process as herein. This gave a leather-like sheet having an apparent density of 0.48. As in Table 2, the sheet had a good feel and a high tear strength.

Comparative Example 1

11 parts of distilled water was added to 100 parts of the aqueous urethane-acrylic composite resin dispersion <1> produced in Reference Example 19 (containing urethane-acrylic composite resin (a2) and surfactant (c)) to prepare an aqueous dispersion having an urethane-acrylic composite resin concentration of 45% by mass. Kept at 70° C., the aqueous dispersion did not heat-sensitive gel; and the viscosity increase in the dispersion kept at 40° C. for 2weeks was 1%. Immediately after its preparation, the aqueous resin dispersion was infiltrated into the nonwoven fabric (A) prepared in Reference Example 1, in the same manner as Example 4. In this, however, a large amount of the aqueous dispersion flowed out into the hot water bath and contaminated the bath. The leather-like sheet fabricated here in had an apparent density of 0.34, and it did not have a fulfilled feel and was like fabric. As in Table 3, the tear strength of the sheet was extremely low.

The aqueous resin dispersion was kept at 40° C. for 2 weeks, and then used for fabricating a leather-like sheet in the same manner as herein. Also in this case, a large amount of the aqueous dispersion flowed out into the hot water bath and contaminated the bath. The leather-like sheet fabricated had an apparent density of 0.31, and it did not have a fulfilled feel and was like fabric. As in Table 3, the tear strength of the sheet was extremely low.

Comparative Example 2

A leather-like sheet was fabricated in the same manner as in Comparative Example 1, for which, however, the aqueous resin dispersion was, immediately after its preparation, infiltrated into the nonwoven fabric (A) and then heated and dried in a hot air drier at 140° C. for 40 minutes. Thus fabricated, the leather-like sheet had an apparent density of 0.48, but its fulfilled feel was not good. As in Table 3, the tear strength of the sheet was not good.

The aqueous resin dispersion was kept at 40° C. for 2 weeks, and then used for fabricating a leather-like sheet in the same manner as herein. The leather-like sheet fabricated had an apparent density of 0.47, but its fulfilled feel was not good. As in Table 3, the tear strength of the sheet was not good.

Comparative Example3

An aqueous solution prepared by dissolving 2 parts of the polymer bvi of Reference Example 10 and 1 part of a surfactant, EM120 in 8 parts of distilled water was added to 100 parts of the aqueous urethane-acrylic composite resin dispersion <1> produced in Reference Example 19 (containing urethane-acrylic composite resin (a2) and surfactant (c)) to prepare an aqueous dispersion having an urethane-acrylic composite resin concentration of 45% by mass. Kept at 70° C., the aqueous dispersion did not heat-sensitive gel; and the viscosity increase in the aqueous dispersion kept at 40° C. for 2 weeks was 1%. Immediately after its preparation, the aqueous resin dispersion was infiltrated into the nonwoven fabric (A) prepared in Reference Example 1, in the same manner as in Comparative Example 2. The leather-like sheet thus fabricated herein had an apparent density of 0.49, but its fulfilled feel was not good. As in Table 3, the tear strength of the sheet was not good.

The aqueous resin dispersion was kept at 40° C. for 2 weeks, and then used for fabricating a leather-like sheet in the same manner as herein. The leather-like sheet fabricated had an apparent density of 0.48, but its fulfilled feel was not good. As in Table 3, the tear strength of the sheet was not good.

Comparative Example 4

An aqueous solution prepared by dissolving 2 parts of the polymer bvii of Reference Example 11 and 1 part of a surfactant, EM120 in 8 parts of distilled water was added to 100 parts of the aqueous urethane-acrylic composite resin dispersion <1> produced in Reference Example 19 (containing urethane-acrylic composite resin (a2) and surfactant (c)) to prepare an aqueous dispersions having an urethane-acrylic composite resin concentration of 45% by mass. The heat-sensitive gelling time of this aqueous dispersion kept at 70° C. was 4 minutes; and after left at 40° C. for 5 days, the dispersion wholly gelled. Immediately after its preparation, the aqueous resin dispersion was infiltrated into the non-woven fabric (A) prepared in Reference Example 1, in the same manner as in Example 4. The leather-like sheet thus fabricated herein had an apparent density of 0.48. As in Table 3, the sheet had a good feel and a high tear strength.

However, the aqueous resin dispersion gelled after left at 40° C. for 5 days. After 2 weeks, therefore, it was useless for fabricating leather-like sheets in the same manner as herein.

Comparative Example 5

An aqueous solution prepared by dissolving 2 parts of the polymer bviii of Reference Example 12 and 1 part of a surfactant, EM120 in 8 parts of distilled water was added to 100 parts of the aqueous urethane-acrylic composite resin dispersion <1> produced in Reference Example 19 (containing urethane-acrylic composite resin (a2) and surfactant (c)) to prepare an aqueous dispersion having an urethane-acrylic composite resin concentration of 45% by mass. Kept at 70° C., the aqueous dispersion did not heat-sensitive gel; and the viscosity increase in the aqueous dispersion kept at 40° C. for 2 weeks was 2%. Immediately after its preparation, the aqueous resin dispersion was infiltrated into the nonwoven fabric (A) prepared in Reference Example 1, in the same manner as in Example 4. In this, however, a large amount of the aqueous dispersion flowed out into the hot water bath and contaminated the bath. The leather-like sheet fabricated herein had an apparent density of 0.36, and it did not have a fulfilled feel and was like fabric. As in Table 3, the tear strength of the sheet was extremely low.

The aqueous resin dispersion was kept at 40° C. for 2 weeks, and then used for fabricating a leather-like sheet in the same manner as herein. Also in this case, a large amount of the aqueous dispersion flowed out into the hot water bath and contaminated the bath. The leather-like sheet fabricated had an apparent density of 0.33, and it did not have a fulfilled feel and was like fabric. As in Table 3, the tear strength of the sheet was extremely low.

Comparative Example 6

An aqueous solution prepared by dissolving 2 parts of the polymer bix of Reference Example 13 and 1 part of a surfactant, EM120 in 8 parts of distilled water was added to 100 parts of the aqueous urethane-acrylic composite resin dispersion <1> produced in Reference Example 19 (containing urethane-acrylic composite resin (a2) and surfactant (c)) to prepare an aqueous dispersion having an urethane-acrylic composite resin concentration of 45% by mass. The heat-sensitive gelling time of this aqueous dispersion kept at 70° C. was 17 minutes; and the viscosity increase in the aqueous dispersion left at 40° C. for 2 weeks was 2%. Immediately after its preparation, the aqueous resin dispersion was infiltrated into the nonwoven fabric (A) prepared in Reference Example 1, in the same manner as in Example 4. In this, however, the aqueous dispersion flowed out into the hot water bath and contaminated the bath. The leather-like sheet fabricated herein had an apparent density of 0.42, and its fulfilled feel was not good. As in Table 3, the tear strength of the sheet was not good.

The aqueous resin dispersion was kept at 40° C. for 2 weeks, and then used for fabricating a leather-like sheet in the same manner as herein. Also in this case, the aqueous dispersion flowed out into the hot water bath and contaminated the bath. The leather-like sheet fabricated had an apparent density of 0.43, and its fulfilled feel was not good. As in Table 3, the tear strength of the sheet was not good.

Comparative Example 7

An aqueous solution prepared by dissolving 2 parts of the polymer bx of Reference Example 14 and 1part of a surfactant, EM120 in 8 parts of distilled water was added to 100 parts of the aqueous urethane-acrylic composite resin dispersion <1> produced in Reference Example 19 (containing urethane-acrylic composite resin (a2) and surfactant (c)) to prepare an aqueous dispersion having an urethane-acrylic composite resin concentration of 45% by mass. The aqueous dispersion did not have a heat-sensitive gellation property; and the viscosity increase in the aqueous dispersion kept at 40° C. for 2 weeks was 1%. Immediately after its preparation, the aqueous resin dispersion was infiltrated into the nonwoven fabric (A) prepared in Reference Example 1, in the same manner as in Example 4. In this, however, a large amount of the aqueous dispersion flowed out into the hot water bath and contaminated the bath. The leather-like sheet fabricated herein had an apparent density of 0.35, and it did not have a fulfilled feel and was like fabric. As in Table 3, the tear strength of the sheet was extremely low.

The aqueous resin dispersion was kept at 40° C. for 2 weeks, and then used for fabricating a leather-like sheet in the same manner as herein. Also in this case, a large amount of the aqueous dispersion flowed out into the hot water bath and contaminated the bath. The leather-like sheet fabricated had an apparent density of 0.34, and it did not have a fulfilled feel and was like fabric. As in Table 3, the tear strength of the sheet was extremely low.

Comparative Example 8

An aqueous solution prepared by dissolving 2parts of the polymer bi of Reference Example 5 in 5 parts of distilled water was added to 100 parts of the aqueous urethane resin dispersion <2> produced in Reference Example 16 (containing urethane resin (a1) and surfactant (c)) to prepare an aqueous dispersion having an urethane resin concentration of 42% by mass. The heat-sensitive gelling time of this aqueous dispersion kept at 70° C. was 8 minutes; and after left at 40° C. for 6 days, the dispersion wholly gelled. Immediately after its preparation, the aqueous resin dispersion was infiltrated into the nonwoven fabric (A) prepared in Reference Example 1, in the same manner as in Example 4. The leather-like sheet thus fabricated herein had an apparent density of 0.47. As in Table3, the sheet had a good feel and a high tear strength.

However, the aqueous resin dispersion gelled after left at 40° C. for 6 days. After 2 weeks, therefore, it was useless for fabricating leather-like sheets in the same manner as herein.

Comparative Example 9

An aqueous solution prepared by dissolving 4 parts of the polymer bi of Reference Example 5 and 1 part of a surfactant, EM109 in 8 parts of distilled water was added to 100 parts of the aqueous urethane resin dispersion <3> produced in Reference Example 17 (containing urethane resin (a1) and surfactant (c)) to prepare an aqueous dispersion having an urethane resin concentration of 31% by mass. Kept at 70° C., the aqueous dispersion did not heat-sensitive gel; and the viscosity increase in the aqueous dispersion kept at 40° C. for 2 weeks was 0%. Immediately after its preparation, the aqueous resin dispersion was infiltrated into the nonwoven fabric (A) prepared in Reference Example 1, in the same manner as in Example 4. In this, however, a large amount of the aqueous dispersion flowed out into the hot water bath and contaminated the bath. The leather-like sheet fabricated herein had an apparent density of 0.30, and it did not have a fulfilled feel and was like fabric. As in Table 3, the tear strength of the sheet was extremely low.

The aqueous resin dispersion was kept at 40° C. for 2 weeks, and then used for fabricating a leather-like sheet in the same manner as herein. Also in this case, a large amount of the aqueous dispersion flowed out into the hot water bath and contaminated the bath. The leather-like sheet fabricated had an apparent density of 0.29, and it did not have a fulfilled feel and was like fabric. As in Table 3, the tear strength of the sheet was extremely low.

Comparative Example 10

An aqueous solution prepared by dissolving 4 parts of the polymer bi of Reference Example 5 in 7 parts of distilled water was added to 100 parts of the aqueous urethane resin dispersion <4> produced in Reference Example 18 (containing urethane resin (a1) and no surfactant (c)) to prepare an aqueous dispersion having an urethane resin concentration of 36% by mass. Kept at 70° C., the aqueous dispersion did not have a heat-sensitive gellability; and the viscosity increase in the aqueous dispersion kept at 40° C. for 2 weeks was 0%. Immediately after its preparation, the aqueous resin dispersion was infiltrated into the nonwoven fabric (A) prepared in Reference Example 1, in the same manner as in Comparative Example 2. The leather-like sheet thus fabricated herein had an apparent density of 0.48, but its fulfilled feel was not good. As in Table 3, the tear strength of the sheet was not good.

The aqueous resin dispersion was kept at 40° C. for 2 weeks, and then used for fabricating a leather-like sheet in the same manner as herein. The leather-like sheet fabricated had an apparent density of 0.47, but its fulfilled feel was not good. As in Table 3, the tear strength of the sheet was not good.

Comparative Example 11

An aqueous solution prepared by dissolving 6 parts of the polymer bi of Reference Example 5 in 13 parts of distilled water was added to 100 parts of the aqueous urethane-acrylic composite resin dispersion <2> produced in Reference Example 20 (containing urethane-acrylic composite resin (a2) and surfactant (c)) to prepare an aqueous dispersion having an urethane-acrylic composite resin concentration of 42% by mass. Kept at 70° C., the aqueous dispersion did not heat-sensitive gel; and the viscosity increase in the aqueous dispersion kept at 40° C. for 2 weeks was 1%. Immediately after its preparation, the aqueous resin dispersion was infiltrated into the nonwoven fabric (A) prepared in Reference Example 1, in the same manner as in Comparative Example2. The leather-like sheet thus fabricated herein had an apparent density of 0.50, but its fulfilled feel was not good. As in Table 3, the tear strength of the sheet was not good.

The aqueous resin dispersion was kept at 40° C. for 2 weeks, and then used for fabricating a leather-like sheet in the same manner as herein. The leather-like sheet fabricated had an apparent density of 0.49, but its fulfilled feel was not good. As in Table 3, the tear strength of the sheet was not good.

Comparative Example 12

An aqueous solution prepared by dissolving 4parts of a surfactant, EM109P and 1 part of an inorganic metal salt, calcium chloride in 14 parts of distilled water was added to 100 parts of the aqueous urethane-acrylic composite resin dispersion <1> produced in Reference Example 19 (containing urethane-acrylic composite resin (a2) and surfactant (c)) to prepare an aqueous dispersion having an urethane-acrylic composite resin concentration of 42% by mass. The heat-sensitive gelling time of this aqueous dispersion kept at 70° C. was 4 minutes; and after left at 40° C. for 3 days, the dispersion wholly gelled. Immediately after its preparation, the aqueous resin dispersion was infiltrated into the nonwoven fabric (A) prepared in Reference Example 1, in the same manner as in Example 4. The leather-like sheet thus fabricated herein had an apparent density of 0.46. As in Table 3, the sheet had a good feel and a high tear strength.

However, the aqueous resin dispersion gelled after left at 40° C. for 3 days. After 2 weeks, therefore, it was useless for fabricating leather-like sheets in the same manner as herein.

Comparative Example 13

An aqueous solution prepared by dissolving 3 parts of a polysiloxane-type heat-sensitive gelling agent (GE Toshiba Silicone's TPA-4380, having an active ingredient content of 33%) and 1 part of a surfactant, EM120 in 7 parts of distilled water was added to 100 parts of the aqueous urethane-acrylic composite resin dispersion <1> produced in Reference Example 19 (containing urethane-acrylic composite resin (a2) and surfactant (c)) to prepare an aqueous dispersion having an urethane-acrylic composite resin concentration of 45% by mass. The heat-sensitive gelling time of this aqueous dispersion kept at 70° C. was 5 minutes; and after left at 40° C. for 2 days, the dispersion wholly gelled. Immediately after its preparation, the aqueous resin dispersion was infiltrated into the nonwoven fabric (A) prepared in Reference Example 1, in the same manner as in Example 4. The leather-like sheet thus fabricated herein had an apparent density of 0.46. As in Table 3, the sheet had a good feel and a high tear strength.

However, the aqueous resin dispersion gelled after left at 40° C. for 2 days. After 2 weeks, therefore, it was useless for fabricating leather-like sheets in the same manner as herein.

From the results in Examples 1 to 7 and Comparative Examples 1 to 13, it is obvious that the leather-like sheets fabricated by the use of the aqueous resin dispersion that satisfies the constitutional requirements of the invention all have a good feel and good physical properties, and, in addition, the aqueous resin dispersion of the invention enables stable fabrication of such good leather-like sheets even at high temperature in summer. Comparative Examples 1 and 2 in which the aqueous resin dispersion does not contain the polymer (b); Comparative Examples 9 to 11 in which the carboxyl group content of the main resin in the aqueous resin dispersion is larger than that defined in the invention; Comparative Example 10 in which the main resin is not stabilized with a surfactant; Comparative Example 3 in which the proportion of the polyoxyethylene group-having monomer (b1) in the polymer (b) is smaller than that defined in the invention; and Comparative Examples 5 to 7 in which the polymer (b) does not satisfy the condition (IV) and oversteps it are all unfavorable, since the aqueous resin dispersion in these does not heat-sensitive gel at all or may heat-sensitive gel only a little, consequently the processability of the resin dispersion is not good and therefore the amount of the resin that may be applied to a fibrous substrate is small, and the resin may move inside the fibrous substrate during the step of drying the aqueous resin dispersion, thereby strongly restraining the fibers that constitute the substrate and, as a result, the sheets fabricated could not have a good feel and their tear strength is low. Comparative Example 4 in which the polymer (b) does not satisfy the condition (IV) and does not reach it; Comparative Example 8 in which the carboxyl group content of the main resin in the aqueous resin dispersion is smaller than that defined in the invention; Comparative Example 12 in which only a surfactant and a metal salt are used for heat-sensitive gellable compounds; and Comparative Example 13 in which a polysiloxane compound is used for a heat-sensitive gellable compound are also unfavorable, since the liquid stability of the resin dispersion used in these is not good though the heat-sensitive gellability thereof is good. In these, good leather-like sheets can be fabricated when the resin dispersions are used immediately after their preparation, but it is impossible to smoothly fabricate leather-like sheets by the use of such unstable resin dispersions at high temperatures especially in summer.

As described in detail hereinabove with reference to the preferred embodiments thereof, the invention provides leather-like sheets having a good feel and good physical properties by the use of an aqueous resin dispersion having good liquid stability and good heat-sensitive gellability, and provides an industrial advantageous method for producing them.

TABLE 1

| Abbreviation | Compound |
|---|---|
| PET | polyethylene terephthalate (having a glass transition point of 78° C.) |
| Alkali-soluble PET | polyethylene terephthalate copolymerized with 4% by mass, relative to the overall resin mass, of polyethylene glycol, and 5 mol %, relative to the dicarboxylic acid component, of sodium sulfoisophthalate |
| IPA-modified PET | polyethylene terephthalate (having a glass transition point of 68° C.) in copolymerized with 10 mol %, relative to the dicarboxylic acid component of isophthalic acid |
| Ethylene-copolymerized PVA | polyvinyl alcohol copolymerized with 8 mol % of ethylene |
| DEGMA | methoxydiethylene glycol monomethacrylate (number of oxyethylene units: 2) |
| TEGMA | methoxytetraethylene glycol monomethacrylate (number of oxyethylene units: 4) |
| PEG(9)MA | methoxypolyethylene glycol monomethacrylate (number of oxyethylene units: 9) |
| PTMG | polytetramethylene glycol having a number-average molecular weight of 2000 |
| PHC | Poly (hexamethylene carbonate) diol having a number-average molecular weight of 2000 |
| ECT | anionic surfactant, [ECT-3NEX] produced by Nikko Chemicals co., ltd |
| EM109P | nonionic surfactant, [Emulgen 109P] (having HLB value of 13.6) produced by Kao corporation |
| EM120 | nonionic surfactant, [Emulgen 120] (having HLB value of 15.3) produced by Kao corporation |
| EM147 | nonionic surfactant, [Emulgen 147] (having HLB value of 16.3) produced by Kao corporation |

TABLE 2

| | Aqueous Resin Dispersion | | Leather-like Sheet (Fresh aqueous resin dispersion was used immediately after its preparation.) | | Leather-like Sheet (After kept at 40° C. for 2 weeks, aqueous resin dispersion was used. | |
|---|---|---|---|---|---|---|
| | Gelling Time in hot water bath at 70° C. (min) | Viscosity Increase after kept at 40° C. for 2 weeks (%) | Feel | Tear Strength (N) | Feel | Tear Strength (N) |
| Example 1 | 7 | 9 | B | 61 | B | 60 |
| Example 2 | 4 | 4 | A | 66 | A | 65 |
| Example 3 | 6 | 3 | A | 71 | A | 72 |
| Example 4 | 5 | 7 | A | 62 | A | 63 |
| Example 5 | 5 | 9 | A | 65 | A | 64 |
| Example 6 | 6 | 12 | B | 61 | B | 60 |
| Example 7 | 6 | 6 | B | 60 | B | 62 |

TABLE 3

| | Aqueous Resin Dispersion | | Leather-like Sheet (Fresh resin dispersion was used immediately after its preparation.) | | Leather-like Sheet (After kept at 40° C. for 2 weeks, resin dispersion was used) | |
|---|---|---|---|---|---|---|
| | Gelling Time in hot water bath at 70° C. (min) | Viscosity Increase after kept at 40° C. for 2 weeks (%) | Feel | Tear Strength (N) | Feel | Tear Strength (N) |
| Comp. Ex. 1 | (not heat-sensitive gellable) | 1 | C | 26 | C | 23 |
| Comp. Ex. 2 | (not heat-sensitive gellable) | 1 | C | 52 | C | 51 |
| Comp. Ex. 3 | (not heat-sensitive gellable) | 1 | C | 53 | C | 53 |
| Comp. Ex. 4 | 4 | (gelled in 5 days) | A | 63 | (fabrication of leather-like sheet impossible) | |
| Comp. Ex. 5 | (not heat-sensitive gellable) | 2 | C | 33 | C | 34 |
| Comp. Ex. 6 | 17 | 2 | C | 50 | C | 52 |

TABLE 3-continued

| | Aqueous Resin Dispersion | | Leather-like Sheet (Fresh resin dispersion was used immediately after its preparation.) | | Leather-like Sheet (After kept at 40° C. for 2 weeks, resin dispersion was used) | |
|---|---|---|---|---|---|---|
| | Gelling Time in hot water bath at 70° C. (min) | Viscosity Increase after kept at 40° C. for 2 weeks (%) | Feel | Tear Strength (N) | Feel | Tear Strength (N) |
| Comp. Ex. 7 | (not heat-sensitive gellable) | 1 | C | 30 | C | 32 |
| Comp. Ex. 8 | 8 | (gelled in 6 days) | B | 59 | (fabrication of leather-like sheet impossible) | |
| Comp. Ex. 9 | (not heat-sensitive gellable) | 0 | C | 25 | C | 24 |
| Comp. Ex. 10 | (not heat-sensitive gellable) | 0 | C | 45 | C | 43 |
| Comp. Ex. 11 | (not heat-sensitive gellable) | 1 | C | 47 | C | 48 |
| Comp. Ex. 12 | 4 | (gelled in 3 days) | A | 63 | (fabrication of leather-like sheet impossible) | |
| Comp. Ex. 13 | 5 | (gelled in 2 days) | A | 61 | (fabrication of leather-like sheet impossible) | |

What is claimed is:

1. An artifical leather fabricated by infiltrating an aqueous resin dispersion (A) into a fibrous substrate, which satisfies the following requirements (I) to (IV):
   (I) the aqueous resin dispersion (A) comprises essentially a main resin (a) stabilized with a surfactant, a polymer (b) having a polyoxyethylene group in its side chains, and a surfactant (c);
   (II) the main resin (a) comprises an urethane resin (a1) and/or an urethane-acrylic composite resin(a2), and the resin skeleton contains from 1 to 10 mmols of a carboxyl group per 100 g of the resin;
   (III) the polymer (b) is obtained through polymerization of a polyoxyethylene group-having ethylenic unsaturated monomer (b1) and any other ethylenic unsaturated monomer (b2) in a ratio by mass (b1)/(b2)=60/40 to 100/0;
   (IV) the percentage, % by mass ($\alpha$) of the polyoxyethylene group in the polymer (b) and the number of mols ($\beta$) of amino groups per gram of the polymer (b) satisfy the following formula (1):

$$35 \leq \alpha + \beta \times 20000 \leq 60 \qquad (1).$$

2. The artificial leather as claimed in claim 1, wherein the aqueous resin dispersion (A) further comprises an inorganic metal salt (d).

3. The artificial leather as claimed in claim 1, wherein the main resin (a) is an urethane-acrylic composite resin (a2) in which the ratio by mass of the urethane resin component to the acrylic polymer component falls between 10/90 and 70/30.

4. The artificial leather as claimed in claim 1, wherein the polyoxyethylene group-having ethylenic unsaturated monomer (b 1) is a compound having a structure of the following general formula (I):

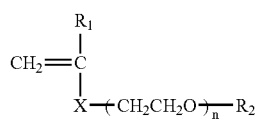

(I)

wherein $R_1$ represents a hydrogen atom or a methyl group; $R_2$ is a group selected from an alkyl group, an aryl group or an alkylaryl group having from 1 to 18 carbon atoms; X represents a group selected from —C(=O)O—, —OC(=O)—, —O—, —NHC(=O)—, —C(=O)NH—; and n indicates an integer of 2 or more.

5. The artificial leather as claimed in claim 1, wherein the number, n, of the repetitions of the oxyethylene unit in the polyoxyethylene group-having ethylenic unsaturated monomer (b1) falls between 2 and 10.

6. The artificial leather as claimed in claim 1, wherein the aqueous 10% solution of the polymer (b) has a clouding point that falls between 10 and 60° C.

7. The artificial leather as claimed in claim 1, wherein the surfactant (c) comprises from 30 to 100% by mass of a nonionic surfactant (c1) having an HLB value of from 12 to 18, and from 0 to 70% by mass of any other surfactant (c2).

8. The artificial leather as claimed in claim 1, wherein the aqueous resin dispersion (A) comprises from 25 to 60% by mass of a main resin (a), from 0.5 to 10% by mass of a polymer (b), from 0.5 to 5% by mass of a surfactant (c) and from 0 to 2% by mass of an inorganic metal salt (d).

9. The artificial leather as claimed in claim 1, wherein the gelling time of the aqueous resin dispersion (A) kept in a closed condition at 70° C. is within 10 minutes, and the viscosity increase in the resin dispersion (A) kept in a closed condition at 40° C. for 2 weeks is at most 50%.

10. The artificial leather as claimed in claim 1, wherein the fibers that constitute the fibrous substrate are ultrafine fibers.

11. An aqueous resin dispersion (A) to be infiltrated into fibrous substrates, which satisfies the following requirements (I) to (IV):
   (I) the aqueous resin dispersion (A) comprises essentially a main resin(a) stabilized with a surfactant, a polymer (b) having a polyoxyethylene group in its side chains, and a surfactant (c);
   (II) the main resin (a) comprises an urethane resin (a1) and/or an urethane-acrylic composite resin (a2), and the resin skeleton contains from 1 to 10 mmols of a carboxyl group per 100 g of the resin;
   (III) the polymer (b) is obtained through polymerization of a polyoxyethylene group-having ethylenic unsaturated monomer (b1) and any other ethylenic unsaturated monomer (b2) in a ratio by mass (b1)/(b2)=60/40 to 100/0;

(IV) the percentage, % by mass ($\alpha$) of the polyoxyethylene group in the polymer (b) and the number of mols ($\beta$) of amino groups per gram of the polymer (b) satisfy the following formula (1):

$$35 \leq \alpha + \beta \times 20000 \leq 60 \qquad (1).$$

12. The aqueous resin dispersion to be infiltrated into fibrous substrates as claimed in claim 11, which further comprises an inorganic metal salt (d).

13. The aqueous resin dispersion to be infiltrated into fibrous substrates as claimed in claim 11, wherein the main resin (a) is an urethane-acrylic composite resin (a2) in which the ratio by mass of the urethane resin component to the acrylic polymer component falls between 10/90 and 70/30.

14. The aqueous resin dispersion to be infiltrated into fibrous substrates as claimed in claim 11, wherein the polyoxyethylene unit-having ethylenic unsaturated monomer (b1) is a compound having a structure of the following general formula (I):

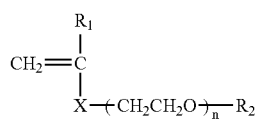

(I)

wherein $R_1$ represents a hydrogen atom or a methyl group; $R_2$ is a group selected from an alkyl group, an aryl group or an alkylaryl group having from 1 to 18 carbon atoms; X represents a group selected from —C(=O)O—, —OC(=O)—, —O—, —NHC(=O)—, —C(=O)NH—; and n indicates an integer of 2 or more.

15. The aqueous resin dispersion to be infiltrated into fibrous substrates as claimed in claim 11, wherein the number, n, of the repetitions of the oxyethylene unit in the polyoxyethylene group-having ethylenic unsaturated monomer (b1) falls between 2 and 10.

16. The aqueous resin dispersion to be infiltrated into fibrous substrates as claimed in claim 11, wherein the aqueous 10% solution of the polymer (b) has a clouding point that falls between 10 and 60° C.

17. The aqueous resin dispersion to be infiltrated into fibrous substrates as claimed in claim 11, wherein the surfactant (c) comprises from 30 to 100% by mass of a nonionic surfactant (c1) having an HLB value of from 12 to 18, and from 0 to 70% by mass of any other surfactant (c2).

18. The aqueous resin dispersion to be infiltrated into fibrous substrates as claimed in claim 11, which comprises from 25 to 60% by mass of a main resin (a), from 0.5 to 10% by mass of a polymer (b), from 0.5 to 5% by mass of a surfactant (c) and from 0 to 2% by mass of an inorganic metal salt (d).

19. The aqueous resin dispersion to be infiltrated into fibrous substrates as claimed in claim 11, of which the gelling time kept in a closed condition at 70°C. is within 10 minutes, and the viscosity increase kept in a closed condition at 40°C. for 2 weeks is at most 50%.

20. A method for fabricating an artificial leather, which comprises infiltrating an aqueous resin dispersion (A) of claim 11 into a fibrous substrate.

21. The method for fabricating an artificial leather as claimed in claim 20, wherein the fibers that constitute the fibrous substrate are ultrafine fibers-forming fibers and the fibers are converted into ultrafine fibers before or after an aqueous resin dispersion (A) has been applied to the substrate.

22. The artificial leather as claimed in claim 1, wherein the polymer (b) has amino groups.

23. The artificial leather as claimed in claim 1, wherein the polymer (b) does not have amino groups.

24. The aqueous resin dispersion as claimed in claim 11, wherein the polymer (b) has amino groups.

25. The aqueous resin dispersion as claimed in claim 11, wherein the polymer (b) does not have amino groups.

* * * * *